*United States Patent* [19]

Nagata

[11] Patent Number: 6,157,494
[45] Date of Patent: Dec. 5, 2000

[54] ZOOM LENS SYSTEM USING A DIFFRACTIVE OPTICAL ELEMENT AND IMAGE PICKUP DEVICE USING THE SAME

[75] Inventor: Tetsuo Nagata, Hachioji, Japan

[73] Assignee: Olympus Optical Co., Ltd., Tokyo, Japan

[21] Appl. No.: 09/290,542

[22] Filed: Apr. 12, 1999

[30] Foreign Application Priority Data

Apr. 30, 1998 [JP] Japan ................... 10-120289

[51] Int. Cl.[7] ................... G02B 15/14
[52] U.S. Cl. ................ 359/683; 359/569; 359/686; 359/687; 359/689; 359/690; 359/691
[58] Field of Search ................ 359/558, 569, 359/570, 680–683, 676, 688–691, 686–687

[56] References Cited

U.S. PATENT DOCUMENTS 5,268,790  12/1993  Chen ........................... 359/558
5,808,810  9/1998  Mihara ......................... 359/690

FOREIGN PATENT DOCUMENTS 9-211329  8/1997  Japan.

*Primary Examiner*—Georgia Epps
*Assistant Examiner*—David N. Spector
*Attorney, Agent, or Firm*—Pillsbury Madison & Sutro LLP

[57] ABSTRACT

The invention provides a high-performance zoom lens system which is well corrected for chromatic aberrations by use of a DOE, makes the angle of incidence of a ray bundle on a diffractive surface as small as possible from a wide-angle side to a telephoto side thereof, and ensures the sufficient number of DOE gratings with respect to the ray bundle. The zoom lens system comprises a negative lens group G2 taking the largest zooming action and at least one positive lens group G3 on an image side thereof. The positive lens group G3 is constructed of one diffractive optical element having a diffractive surface $r_{10}$.

5 Claims, 10 Drawing Sheets

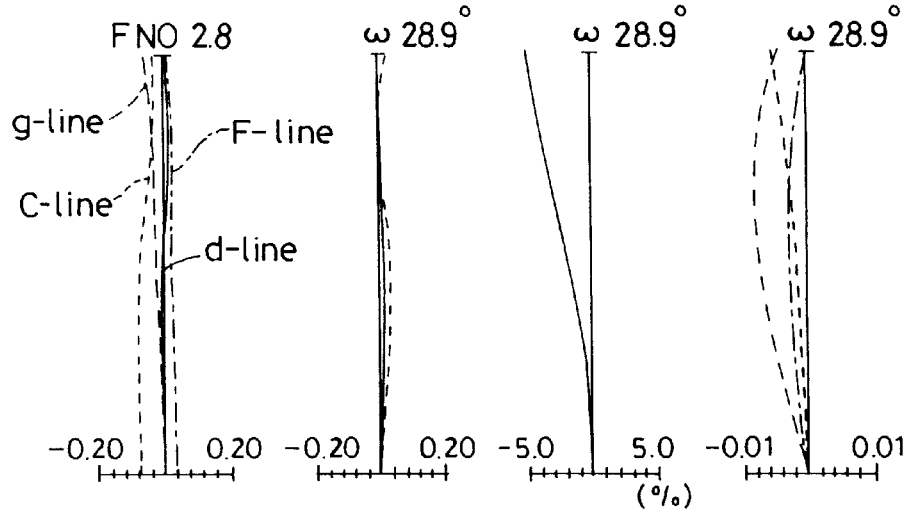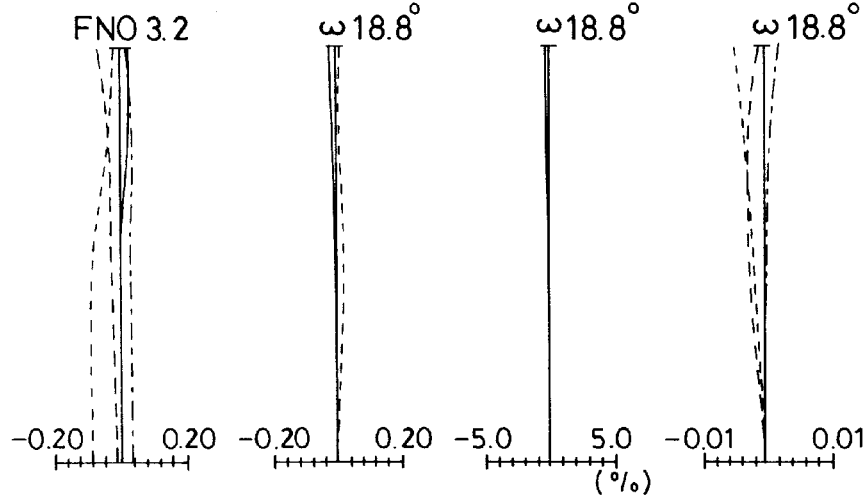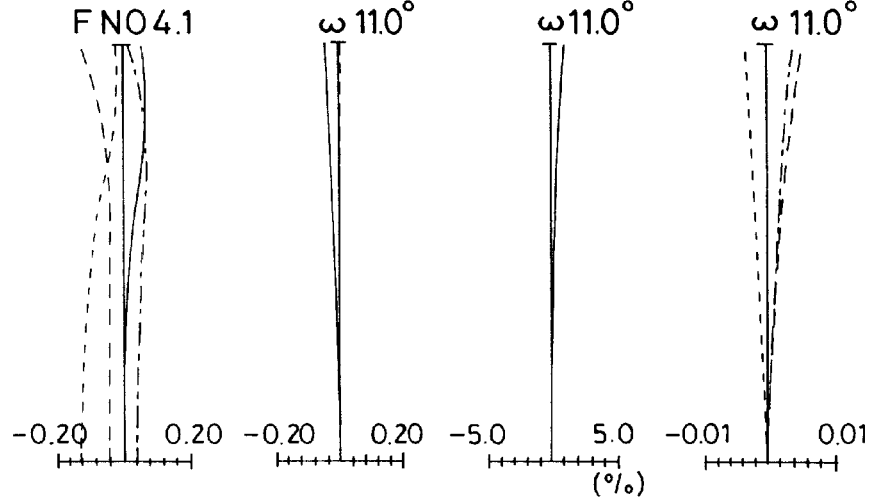

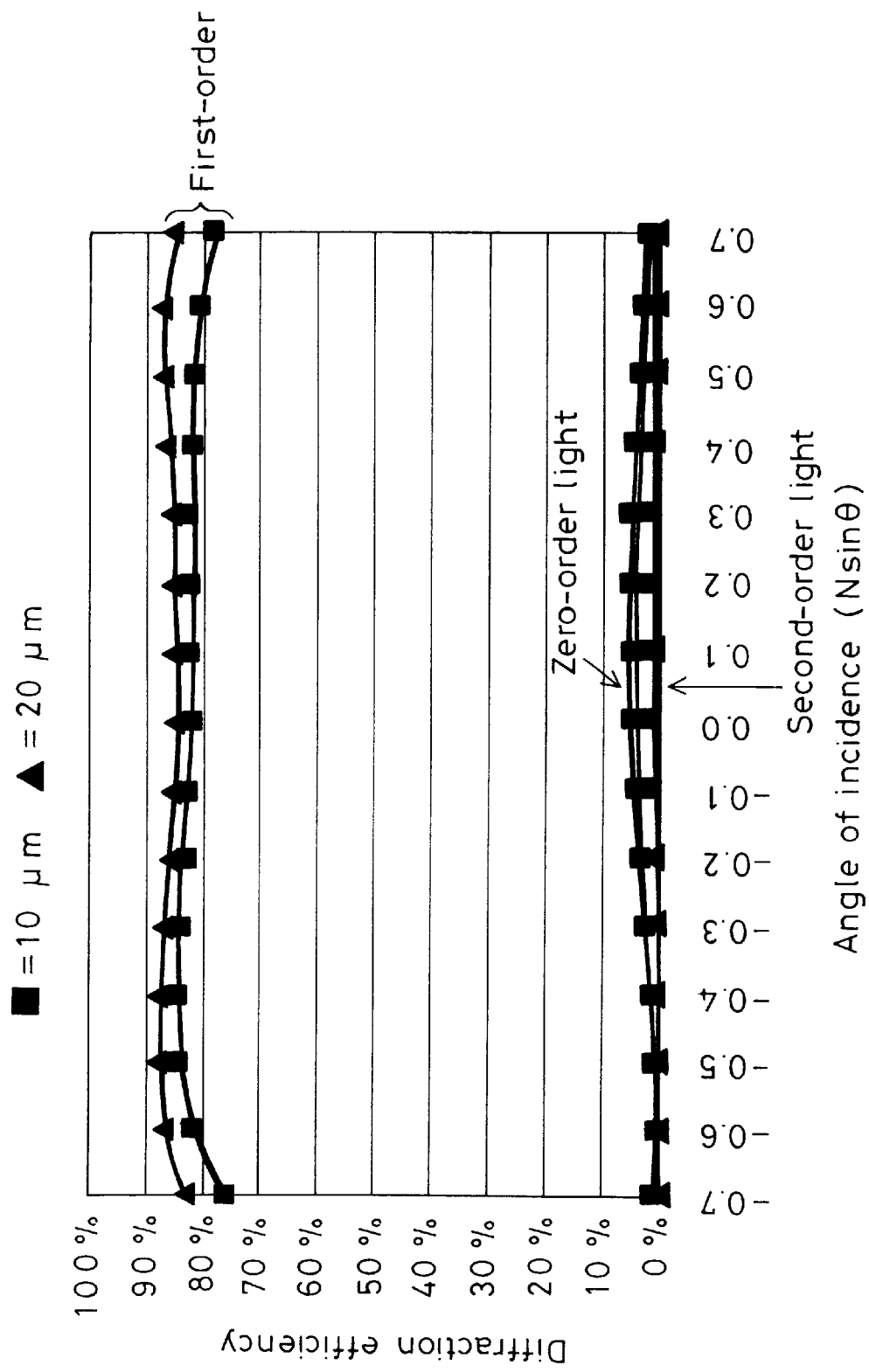

ZOOM LENS SYSTEM USING A DIFFRACTIVE OPTICAL ELEMENT AND IMAGE PICKUP DEVICE USING THE SAME

BACKGROUND OF THE INVENTION

1. Field of the Invention

The present invention relates generally to a zoom lens used with an image pickup device, and more particularly to a zoom lens using a diffractive optical element, which is suitable for use with video cameras or digital still cameras, as well as an image pickup device using such a zoom lens.

2. Discussion of the Related Art

For recently developed zoom lenses for image pickup devices using image pickup elements such as CCDs, there are proposed a number of zoom lens systems, each using four lens groups, i.e., comprising, in order from its object side, a first positive lens group, a second negative lens group, a third positive or negative lens group and a fourth positive or negative lens group. For such a zoom lens system it is preferable that aberrations in each group are reduced as much as possible. To this end it is required that each group be constructed of a plurality of positive and negative lenses. If a diffractive optical element (hereinafter DOE for short) is used in such a zoom lens system, however, it is then possible to make satisfactory correction for chromatic aberrations with no increase in the number of lenses used, as already proposed in the art. For instance, JP-A 9-211329 discloses a zoom lens system in which a DOE is used in the first or second lens group. However, if the diffraction efficiency of the DOE with respect to design order-of-diffraction light, then the intensity of light other than the design order-of-diffraction light (hereinafter called the unnecessary light) increases, resulting in a failure in obtaining sufficient image quality. Especially to enable the DOE to be used in a wide wavelength region ($\lambda$=about 400 nm to about 700 nm) where phototaking lenses are used, the DOE should have high diffraction efficiency. If the DOE is of sawtooth shape in section, it is then possible to improve its diffraction efficiency. For instance, 100% diffraction efficiency can be theoretically obtained at one wavelength and one angle of view. However, as the angle of incidence of a ray bundle on a DOE diffractive surface becomes large, the diffraction efficiency drops drastically. For further information about this, see articles "Scalar theory of transmission relief gratings", Optics Communications, Vol. 80, No. 5, 6/307–311 (1991), "Blazed holographic gratings for polychromatic and miltidirectional incident light", J. Opt. Soc. Am., Vol. 9, No. 7/1196–1199 (1992), etc. Thus, the zoom lens system with the DOE used in the first lens group, disclosed in JP-A 9-211329, cannot immediately be used because the angle of incidence of the ray bundle on the diffractive surface is very large. When the DOE is used in the first lens group of a zoom lens system, the angle of incidence of a ray bundle on a DOE diffractive surface must be made as small as possible because that angle of incidence varies largely from a wide-angle side to a telephoto side of the zoom lens system.

Unless the sufficient number of DOE gratings is ensured with respect to a ray bundle incident on the diffractive surface, then no sufficient image quality is obtained because the intensity distribution of design order-of-diffraction light spreads wide. For further information about this, see an article "Rigorous electromagnetic analysis of diffraction by finite-number-of-periods gratings", J. Opt. Soc. Am. A/Vol. 14, No. 4/907–917 (1997). Thus, the use of the DOE in the first or second lens group of the zoom lens system causes deterioration of image quality, because it is impossible to ensure the sufficient number of gratings with respect to a ray bundle in the vicinity of the optical axis on the wide-angle side in particular.

U.S. Pat. No. 5,268,790 comes up with a zoom lens system wherein DOEs are used in the second and third lens groups. However, the sufficient number of gratings cannot be obtained with respect to a ray bundle in the vicinity of the optical axis, because the powers of DOE diffractive surfaces are very weak and the number of gratings is very limited.

SUMMARY OF THE INVENTION

In view of such problems associated with the prior art as mentioned above, one object of the present invention is to provide a high-performance zoom lens system which is well corrected for chromatic aberrations by use of a DOE, and which makes the angle of incidence of a ray bundle on a diffractive surface as small as possible from a wide-angle side to a telephoto side of the zoom lens system and ensures the sufficient number of gratings on the DOE with respect to the ray bundle, and an image pickup device using the same.

According to one aspect of the present invention, the above object is achieved by the provision of a zoom lens system including a negative lens group having the largest zooming action and at least one positive lens group located on an image side thereof, said positive lens group being made up of one diffractive optical element.

According to another aspect of the present invention, there is provided a zoom lens system including a negative lens group having the largest zooming action and at least one positive lens group located on an image side thereof, said positive lens group comprising at least one positive lens and at least one negative lens, and any one surface of said positive lens and said negative lens having a diffractive surface.

According to yet another aspect of the present invention, there is provided a zoom lens system including a negative lens group having the largest zooming action and at least one positive lens group located an image side thereof, a surface in said positive lens group, which surface is located nearest to an object side of said zoom lens system, satisfying the following condition (1) and a surface of said positive lens group located nearer to the image side having a diffractive surface:

$$0.2 < R_{a1}/f_S < 3.0 \tag{1}$$

where $f_S$ is $f_S = \sqrt{(f_W \times f_T)}$ wherein $f_W$ is a d-line focal length of the zoom lens system at a wide-angle end thereof and $f_T$ is a d-line focal length of the zoom lens system at a telephoto end thereof, and $R_{a1}$ is a paraxial radius of curvature of a surface in said lens group having a diffractive surface, which surface is located nearest to an object side of the zoom lens system.

According to a further aspect of the present invention, there is provided a zoom lens system including in order from an object side thereof, one lens group, a negative lens group having the largest zooming action and a positive lens group, said positive lens group having a diffractive surface satisfying the following condition (2):

$$0.03 < f_a/f_{DOE} < 0.50 \tag{2}$$

where $f_a$ is a d-line focal length of said lens group having a diffractive surface and $f_{DOE}$ is a d-line focal length of said diffractive surface.

Why the above arrangements are used in the present invention will now be explained with reference to their actions.

To apply a DOE to a phototaking lens, the DOE should have high diffraction efficiency as already explained. As the angle of incidence of a ray bundle on a DOE diffractive surface is large, however, there is a remarkable diffraction efficiency drop due to the diffraction efficiency of the DOE depending on the angle of incidence. FIGS. 16, 17 and 18 are graphs illustrating the angle-of-incidence dependence of the first-order diffraction efficiency vs. wavelength. Here the optimum design wavelength for the DOE is assumed to be an e-line, the e-line refractive index of a substrate $N_e=1.5$, the grating period $\Lambda=10$ μm, 20 μm, and the side of incidence of a light ray air. Shown in these figures are the diffraction efficiencies upon TE polarization with respect to 0-order light, first-order light and second-order light at C-, e- and F-lines. In calculation, reflections at lens interfaces, too, are taken into consideration. It is found from these graphs that as the angle of incidence becomes large, the diffraction efficiency for the first-order light decreases with an increase in the diffraction efficiency for the unnecessary light. In addition, a noticeable diffraction efficiency decrease is found on a short wavelength side (F-line). This causes considerable deterioration in image quality especially when the DOE is used in a visible region (about 400 to 700 nm wavelengths) where the phototaking lens is used. It is also found that the shorter the grating period, the more noticeable the angle-of-incidence dependence is. It is thus required to make the angle of incidence of a ray bundle on the diffractive surface as small as possible. It is not particularly preferable to use the DOE in the first lens group of the phototaking lens system because of large fluctuations in the angle of incidence of an off-axis ray bundle on the wide-angle side and telephoto side.

Unless the sufficient number of gratings with respect to a ray bundle incident on the diffractive surface is ensured, then insufficient image quality is obtained because the intensity distribution of the design order-of-diffraction light spreads wide. When the number, N, of gratings is large enough, the intensity distribution of light diffracted in each direction has a very sharp profile. However, when the DOE is used in an ordinary phototaking lens system, the number, N, of gratings is finite and the inter-grating spacing is large at the center of the grating arrangement and become narrows far away from the center of the grating arrangement. For this reason, the height of a marginal ray through a negative lens group taking a chief zooming action and a lens group on the object side with respect to the negative lens group is very low on the wide-angle side, and so it is impossible to ensure the sufficient number of gratings with respect to a ray bundle in the vicinity of the optical axis.

It is thus preferable that the DOE is used in the positive lens group located on the image side with respect to the negative lens group having the largest zooming action. On the wide-angle side in particular, the angle of an off-axis chief ray of object light is very large with respect to the optical axis of the system. To narrow down a difference in the angle of incidence between an axial ray bundle and an off-axis ray bundle, the action of the negative lens group is needed. For this reason, the negative lens group is located on the object side with respect to the lens group having a diffractive surface, thereby narrowing down the difference in the angle of incidence between the axial ray bundle and the off-axis ray bundle. It is thus possible to make the angle of incidence of the ray bundles on the diffractive surface as small as possible from the wide-angle side to the telephoto side. Since the axial ray bundle is once diverged in the negative lens group, the height of an axial marginal ray through the positive lens group becomes very large. When the DOE is used in the positive lens group in the rear of the negative lens group, it is thus possible to ensure the sufficient number of gratings with respect to the ray bundle from the wide-angle side to the telephoto side.

In the first zoom lens system of the present invention, it is also preferable that the above positive lens group is constructed of one diffractive optical element. It is here to be noted that when the positive lens group is made up of one lens, chromatic aberrations cannot be corrected inside. In the prior art, aberration fluctuations are reduced as much as possible by fixing the positive lens group during zooming. However, it is then impossible to reduce the size of a lens system. In the present invention, the positive lens group is designed to be movable during zooming, thereby reducing the size of the lens system.

However, when the positive lens group is movable, vary large aberration fluctuations occur from the wide-angle side to the telephoto side. To achieve the target performance, the positive lens group should be made up of a plurality of positive and negative lenses. According to the present invention, however, it is possible to minimize chromatic aberrations in the positive lens group by using one diffractive surface therein. This in turn makes it possible to achieve satisfactory image formation capabilities, and reduce the number of lenses and so the size of a phototaking lens system.

In the second zoom lens system of the present invention, it is desirable that the above positive lens group comprises at least one positive lens and at least one negative lens, with any one surface of the lenses having a diffractive surface. When it is intended to enhance the performance of a lens system with its size reduction, a positive lens group thereof should have some power for achieving the size reduction, and a diffractive surface should have power corresponding to that of the positive lens group so as to make satisfactory correction for chromatic aberrations. Here a DOE is regarded as a refractive optical system. Since the DOE has high dispersion as expressed by an Abbe's number of −3.45, secondary spectra of longitudinal chromatic aberration occurring in a positive lens group of the system become large as the power of a DOE diffractive surface becomes strong. Consequently, it is impossible to ensure the performance of the system. Therefore, if at least one negative positive lens is used in combination with the positive lens group thereby making the power of the diffractcive power weak, it is then possible to obtain very satisfactory image formation capabilities while the occurrence of secondary spectra is minimized.

In the third zoom lens system of the present invention, it is desirable that the surface located nearest to the object side in the positive lens group satisfies the following condition (1) and the surface in the positive lens group, which surface is located on the image side with respect to the first-mentioned surface, has a diffractive surface:

$$0.2 < R_{a1}/f_S < 3.0 \tag{1}$$

where $f_S$ is $f_S = \sqrt{(f_W \times f_T)}$ wherein $f_W$ is a d-line focal length of the zoom lens system at a wide-angle end thereof and $f_T$ is a d-line focal length of the zoom lens system at a telephoto end thereof, and $R_{a1}$ is a paraxial radius of curvature of a surface in said lens group having a diffractive surface, which surface is located nearest to the object side of the zoom lens system.

To avoid a drop of the diffraction efficiency of the DOE, it is desirable to make the angle of incidence of the ray bundle on the diffractive surface as small as possible, as already mentioned. The angle of the off-axis chief ray of object light with respect to the surface in the positive lens group in the rear of the negative lens group, which surface is located nearest to the object side, is slightly large with respect to the optical axis. To achieve a further lowering of the angle of incidence, it is desirable that a lens surface having a radius of curvature in the range defined by condition (1) is located nearest to the object side and the diffractive surface is located on the image side with respect to the lens surface, because the angle of incidence can be minimized from the wide-angle side to the telephoto side.

In other words, condition (1) defines the radius of curvature of the surface in the positive lens group, which surface is located nearest to the object side. When the upper limit of 3.0 in condition (1) is exceeded, the angle of the off-axis chief ray with respect to the optical axis remains large, and so does the angle of incidence of the ray bundle on the diffractive surface. When the lower limit of 0.2 in condition (1) is not reached, the angle of the axial marginal ray with respect to the optical axis becomes too large, and so does the angle of incidence of the axial ray bundle with respect to the diffractive surface. The height of the axial marginal ray, too, becomes small under the action of the surface located on the object side, and so it is impossible to ensure the sufficient number of gratings with respect to the axial ray bundle. As long as condition (1) is satisfied, it is thus possible to make the angle of incidence smaller than mentioned above.

More preferably, the range defined by condition (1) should be narrowed down to that defined by the following condition (3):

$$0.3 < R_{a1}/f_S < 2.0 \tag{3}$$

By satisfying the range defined by condition (3), it is possible to minimize the angle of incidence and, hence, reduce the diffraction efficiency drop as much as possible.

In the fourth zoom lens system of the present invention, it is desired to satisfy the following condition (2):

$$0.03 < f_a/f_{DOE} < 5.0 \tag{2}$$

where $f_a$ is a d-line focal length of said lens group having a diffractive surface and $f_{DOE}$ is a d-line focal length of said diffractive surface.

Condition (2) defines the power of the lens group having a diffractive surface with respect to the power of the diffractive surface. When the lower limit of 0.03 in condition (2) is not reached, the power of the diffractive surface becomes very weak, and so it is difficult to make satisfactory correction for chromatic aberrations occurring in the lens group. In addition, the fact that the power of the diffractive surface is weak means that there is a large decrease in the number of gratings. This is not preferable because it is impossible to ensure the sufficient number of gratings in a ray bundle in the vicinity of the optical axis. When the upper limit of 0.50 in condition (2) is exceeded, the power of the diffractive surface becomes strong, resulting in overcorrection of chromatic aberrations occurring in the lens group. In addition, very large secondary spectra of longitudinal chromatic aberration occur in the lens group, resulting in a failure in achieving high performance. Further, the fact that the power of the diffractive surface is strong implies that there is a large narrowing of the inter-grating spacing at the periphery of the diffractive surface. A narrow inter-grating spacing is not preferable because of a large drop of diffraction efficiency due to the angle-of-incidence dependence. By satisfying the range defined by condition (2), it is thus possible to prevent a lowering of the diffraction efficiency of the DOE due to the angle-of-incidence dependence, and ensure the sufficient number of gratings, thereby reducing a spreading of the intensity distribution of diffracted light.

More preferably, the range defined by condition (2) should be narrowed down to that defined by the following condition (4):

$$0.04 < f_a/f_{DOE} < 0.30 \tag{4}$$

By satisfying the range defined by condition (4), it is possible to minimize the lowering of diffraction efficiency and make more satisfactory correction for chromatic aberrations.

In the first, second and fourth zoom lens groups, it is desired to satisfy condition (1) and, optionally, condition In the first, second and fourth zoom lens systems, it is further desired to satisfy condition (2) and, optionally, condition (4).

Conditions (1) to (4) have the same effects on each zoom lens system of the present invention, as explained above.

In the first, third and fourth zoom lens systems, it is desired to satisfy the following condition (5):

$$-5.0 < S_{DOE} < -1.0 \tag{5}$$

where $S_{DOE}$ is a shaping factor of the diffractive optical element or $S_{DOE} = (R_f + R_b)/(R_f - R_b)$ wherein $R_f$ and $R_b$ are paraxial radii of curvature of surfaces of the diffractive optical element located on the object and image sides, respectively, or a paraxial radius of curvature of substrate shape in the case of a surface having a diffractive surface formed thereon.

Condition (5) defines the shape of the diffractive optical element, and is a condition for making satisfactory correction for chromatic aberrations. When the upper limit of −1.0 in condition (5) is exceeded, very large spherical aberration occurs. At −1.0 or lower, spherical aberrations of opposite signs occur on the object- and image-side surfaces, and balance each other out. In addition, aberration fluctuations incidental to zooming, too, can be reduced. When the lower limit of −5.0 in condition (5) is not reached, the angle of incidence of the off-axis chief ray become large due to a decrease in the radius of curvature of the surface. Accordingly, coma and astigmatism become strikingly worse. By satisfying the range defined by condition (5), it is thus possible to make satisfactory correction for spherical aberration, coma and astigmatism.

More preferably, condition (5) should be narrowed down to the range defined by the following condition (6):

$$-3.0 < S_{DOE} < -1.2 \tag{6}$$

By satisfying the range defined by condition (6), it is further possible to make satisfactory correction for monochromatic aberration.

In the second zoom lens system of the present invention, it is desired to satisfy the following condition (7):

$$-2.0 < f_{DOE}/V < 1.0 \tag{7}$$

where $f_{DOE}$ is a d-line focal length of the diffractive surface, and V is an equivalent Abbe's number of the positive lens group, and is a function of the focal length and Abbe's number of a refractive lens except the diffractive surface, as defined below.

$$1/V = \sum_{i}^{n}(1/\nu_i f_i) \qquad (8)$$

where $\nu_i$ and $f_i$ are an Abbe's number and a d-line focal length of an i-th lens in the positive lens group, respectively.

Condition (7) defines the relationship between the equivalent Abbe's number of the diffractive lens in the positive lens and the power of the diffractive surface, thereby making satisfactory correction for chromatic aberrations from the wide-angle side to the telephoto side. Exceeding the upper limit of 1.0 in condition (7) is not preferable because the power of the negative lens in the positive lens group becomes weak, resulting in undercorrection of longitudinal chromatic aberration in the positive lens group. If the power of the diffractive surface is extremely increased so as to make satisfactory correction for longitudinal chromatic aberration in the positive lens group, large secondary spectra occurs, ending up with a failure in achieving the target performance. When the lower limit of −2.0 in condition (7) is not reached, the refractive lens causes overcorrection of longitudinal chromatic aberration, resulting in a failure in achieving satisfactory image formation capabilities. Further, the power of the DOE becomes weak, and so the number of gratings becomes too small to ensure the sufficient number of gratings with respect to a ray bundle in the vicinity of the optical axis.

By satisfying the range defined by condition (7), it is possible to make satisfactory correction for chromatic aberrations from the wide-angle side to the telephoto side.

More preferably, condition (7) should be narrowed down to the range defined by the following condition (9):

$$-1.5 < f_{DOE}/V < 0.5 \qquad (9)$$

Preferably, the first zoom lens system of the present invention should comprise, in order from an object side thereof, a first lens group having positive power, a second lens group having negative power and a third lens group having positive power, said third lens group being made up of one diffractive optical element.

Preferably, the second zoom lens system of the present invention should include, in order from an object side thereof, a first lens group having positive power, a second lens group having negative power and a third lens group having positive power, said third lens group including at least one positive lens and at least one negative lens with any one surface of said lenses having a diffractive surface.

Preferably, the third zoom lens system of the present invention should comprise, in order from an object side thereof, a first lens group having positive power, a second lens group having negative power and a third lens group having positive power, a surface located nearest to the object side in said third lens group satisfying condition (1) or (3), and a surface in said third lens group, which is located on an image side of the zoom lens system with respect to said first-mentioned surface, having a diffractive surface.

Such arrangements enable a phtotaking lens having a zoom ratio in the range defined by the following condition (10) to be achieved in a very compact form. Under the action of the second lens group having negative power, the height of a marginal ray through the third lens group becomes largest, so that the sufficient number of gratings can be ensured with respect to an axial ray bundle.

$$2.5 < Z < 15.0 \qquad (10)$$

where Z is a zoom ratio or $Z = f_T/f_W$.

Preferably, each of the first to fourth zoom lens systems of the present invention should comprise, in order from an object side thereof, a first lens group having positive power, a second lens group having negative power, a third lens group having positive power and a fourth lens group having positive power, with a diffractive surface used in the third or fourth lens group.

It is not preferable to use the diffractive surface in the first lens group of the zoom lens system, as already stated, because there is a large fluctuation in the angle of incidence of a ray bundle on the diffractive surface from the wide-angle side to the telephoto side. The first and second lens groups are also not preferable for the provision of the diffractive surface because it is difficult to ensure the sufficient number of gratings with the respect to a ray bundle in the vicinity of the optical axis on the wide-angle side. The diffractive surface should preferably be used in the third or fourth lens group. Especially when the DOE is used in the third lens group, it is possible to ensure the sufficient number of gratings with the ray bundle in the vicinity of the optical axis, because the height of an axial marginal ray becomes largest on the wide-angle side.

In the first to fourth zoom lens systems of the present invention, it is preferable to satisfy the following condition (11):

$$0.10 < f_S/f_a < 1.00 \qquad (11)$$

Condition (11) is to standardize a focal length $f_a$ of the lens group having a diffractive surface with an intermediate focal length $f_S$ of the zoom lens system. Falling short of the lower limit of 0.10 in condition (11) is not preferable because the positive power of the lens group becomes weak, and so it is difficult to reduce the size of the lens system. In addition, the power of the diffractive surface becomes very weak in proportion to the power of the lens group. For this reason it is impossible to ensure the sufficient number of gratings with respect to an axial ray bundle. When the upper limit of 1.00 in condition (11) is exceeded, the power of the lens group becomes strong. To ensure a sufficient back focus, it is then required to increase the power of the negative lens taking a primary zooming action, which is located on the object side with respect to this lens group. This in turn causes an increase in the amount of spherical aberration and coma occurring in each lens group. In addition, if the power of the lens group becomes strong, the diffractive surface should have additional power to make satisfactory correction for chromatic aberrations. Consequently, large secondary spectra of longitudinal chromatic aberration occur in the lens group. By satisfying the range of condition (11), it is thus possible to obtain satisfactory image formation capabilities.

More preferably, the range of condition (11) should be narrowed down to the range defined by the following condition (12):

$$0.20 < f_S/f_a < 0.95 \qquad (12)$$

By satisfying the range of condition (12), it is possible to make satisfactory correction for both spherical aberration and coma, so that ever higher performance can be achieved.

Furthermore, the present invention provides an image pickup device making use of at least one of the first to fourth zoom lens systems. By using such zoom lens systems as explained above, it is possible to provide an extremely compact yet high-performance image pickup device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 13(a), 13(b), 13(c) and 13(d) are aberration diagrams for Examples 1 at the wide-angle end.

FIGS. 14(a), 14(b), 14(c) and 14(d) are aberration diagrams for Example 1 at the standard setting.

FIGS. 15(a), 15(b), 15(c) and 15(d) are aberration diagrams for Example 1 at the telephoto end.

FIG. 16 is a graphical representation of the angle-of-incidence dependence of diffraction efficiency for each order-of-diffraction light at C-line.

DESCRIPTION OF THE PREFERRED EMBODIMENTS

Set out below are Examples 1 to 12 of the zoom lens system according to the present invention.

A well-established Sweatt Model is known for how to design a zoom lens system with the diffractive optical element (DOE) used herein. This model is described in W. C. Sweatt, "NEW METHODS OF DESIGNING HOLOGRAPHIC ELEMENTS", SPIE, Vol. 125, Clever Optics, 46–53 (1997). In this design method, the DOE is regarded as being a virtual refractive lens having an ultra-high refractive index (an ultra-high index lens). In the following examples, too, this method is used. In each example, the DOE was designed at 587.56 nm wavelength (d-line) with a virtual refractive index of 1001. The aspherical surface of the ultra-high index lens is defined below. Here let a Z-axis and a Y-axis be an optical axis direction and a direction perpendicular to the optical axis, respectively. Then, the aspherical surface is given by $$Z=CY^2/[1+\sqrt{\{1-(1+K)C^2Y^2\}}]+A_4Y^4+A_6+Y^6+A_8Y^8+A_{10}Y^{10}+ \quad (a)$$

where C is curvature at a surface apex (=1/r where r is a radius of curvature), K is a conical coefficient, and $A_4$, $A_6$, $A_8$, and $A_{10}$ are fourth, sixth, eighth, and tenth aspherical coefficients, respectively.

The surface coming in contact with the diffractive surface at null thickness is a surface of a substrate material. Actually, the diffractive surface is fabricated on the surface of the substrate material using a phase change found from a difference between the aspherical shape of the diffractive surface and the surface shape of the material, and the indices of refraction, and converting the phase change to a diffraction grating pitch. In other words, it is the surface of the substrate material which has final lens action in each of the examples given later. In this regard, it is to be noted that an aspherical surface defined by an ultra-high index refractive lens and here called the diffractive surface does not actually exist. In the lens section corresponding to each example, however, surface Nos. denoting the diffractive surfaces in the numerical data are shown in terms of $r_{13}$, $r_{14}$, etc.

Figure 19:
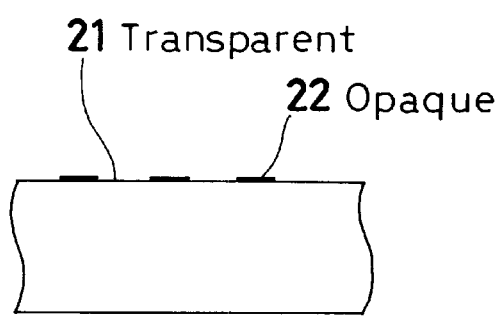
FIGS. 19(a), 19(b), 19(c), 19(d), 19(e) and 19(f) are sectional views of some illustrative shapes of the diffractive surface.
Figure 19:
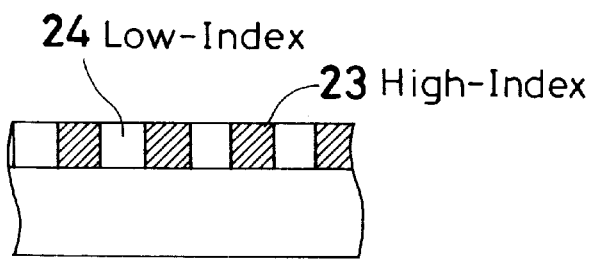
Figure 19:
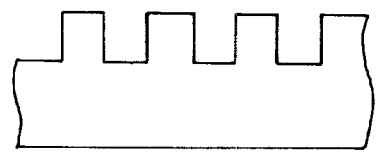
Figure 19:
Figure 19:
Figure 19:

Some exemplary sectional shapes of the diffractive surface are shown in FIG. 19. Shown in FIG. 19(a) is a diffractive surface called an amplitude-modulated type wherein an alternate arrangement of transparent and opaque portions 21 and 22 is provided, with the thickness of each opaque portion 22 being substantially zero. Shown in FIG. 19(b) is an alternate arrangement of high- and low-refractive index portions 23 and 24, to which diffraction is imparted through a phase difference due to a refractive index difference. Shown in FIG. 19(c) is an alternate arrangement of rectangular asperities, to which diffraction is imparted through a phase difference due to a thickness difference. This arrangement is also called a 2-level binary element. Shown in FIG. 19(d) is a kinoform arrangement having a saw-toothed surface, to which diffraction is imparted by a phase difference due to a continuous thickness difference. FIGS. 19(e) and 19(f) are illustrative of binary elements to 4-, and 8-level approximation of kinoform. Thus, some diffractive surface shapes are available. In the practice of the present invention, however, it is preferable to use the kinoform of FIG. 19(d), and the 4-, or more level binary elements of FIGS. 19(e) and 19(f) so that the diffraction efficiency can be increased to make full use of the quantity of light.

FIGS. 1 to 12 are sectional schematics of Examples 1 to 12 of the zoom lens system according to the present invention, as taken along an optical axis thereof. More specifically, FIGS. 1(a), 1(b) and 1(c) are sectional representations of Example 1 at a wide-angle end (a), a standard setting (b) and a telephoto end (c) thereof, as taken along the optical axis. FIGS. 2 to 12 are sectional representations of Examples 2 to 12, each at a wide-angle end, as taken along the optical axis. Examples 1 to 12 are each directed to a zooming lens system comprising a negative lens group taking a chief zooming action and a positive lens group located on an image side thereof, with a DOE used in the positive lens group. It is thus possible to make the angle of incidence of a ray bundle on a DOE diffractive surface as small as possible on a wide-angle side to a telephoto side of the lens system. In addition, it is possible to ensure the sufficient number of DOE gratings with respect to a ray bundle in the vicinity of an optical axis of the lens system. Here, one plane-parallel plate located nearest to the image side of the zoom lens system in each example should be regarded as being an infrared cut filter, a low-pass filter or the like.

As shown in FIG. 1, Example 1 is directed to a zoom lens system constructed of, in order of an object side thereof, a first lens group G1 consisting of one positive meniscus lens convex on the object side, a second lens group G2 consisting of a negative meniscus lens convex on the object side and a positive meniscus lens convex on the object side and having the largest zooming action, a stop S, a third lens group G3 made up of a DOE consisting of a positive meniscus lens convex on the object side with a diffractive surface fabricated on a surface thereof located on an image side of the zoom lens system, and a fourth lens group G4 consisting of one double-convex lens. From a wide-angle end to a telephoto end of the zoom lens system, the second group G2 moves toward the image side and the third and fourth lens groups G3 and G4 move toward the object side while the first lens group G1 and the stop S remain fixed. Two aspherical surfaces are used, one on a surface located nearest to the image side in the second lens group G2 and another on a surface is the fourth lens group G4, which surface is located on the object side. The zoom lens system of this example has a zoom ratio of 3, and achieves very satisfactory image formation capabilities with fourth lens groups or five lenses. In three states, i.e., the wide-angle, intermediate and telephoto states, the angle between a chief ray and the normal to the diffractive surface is about 7.1° at the maximum. The number of gratings included in an axial ray bundle is 32 at the wide-angle end, and 27 at the telephoto end.

Figure 1A:
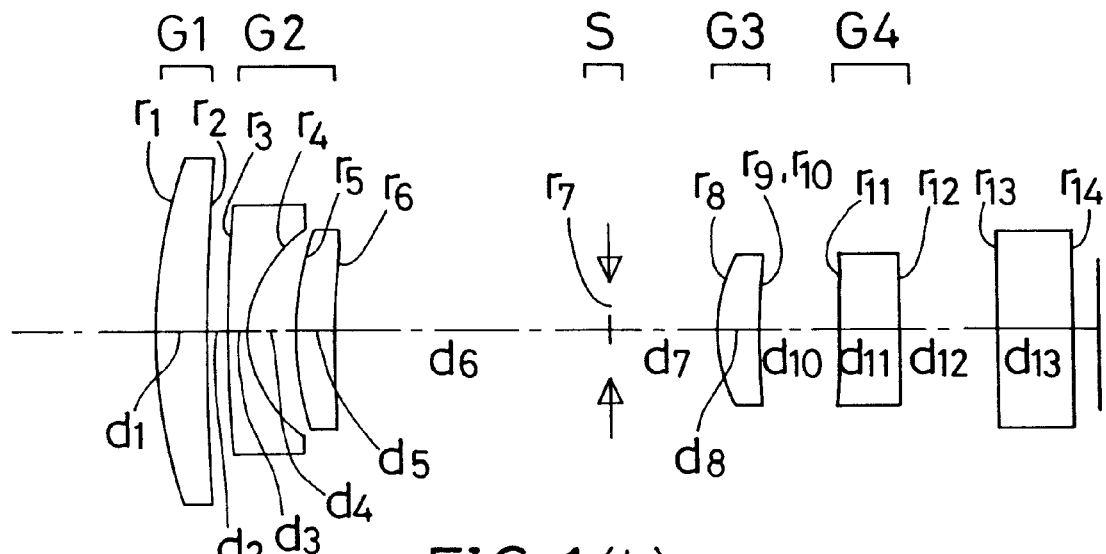
FIGS. 1(a), 1(b) and 1(c) are sectional schematics, taken along an optical axis, of Example 1 of the zoom lens system according to the present invention at a wide-angle end (a), a standard setting (b) and a telephoto end (c) thereof.
Figure 1B:
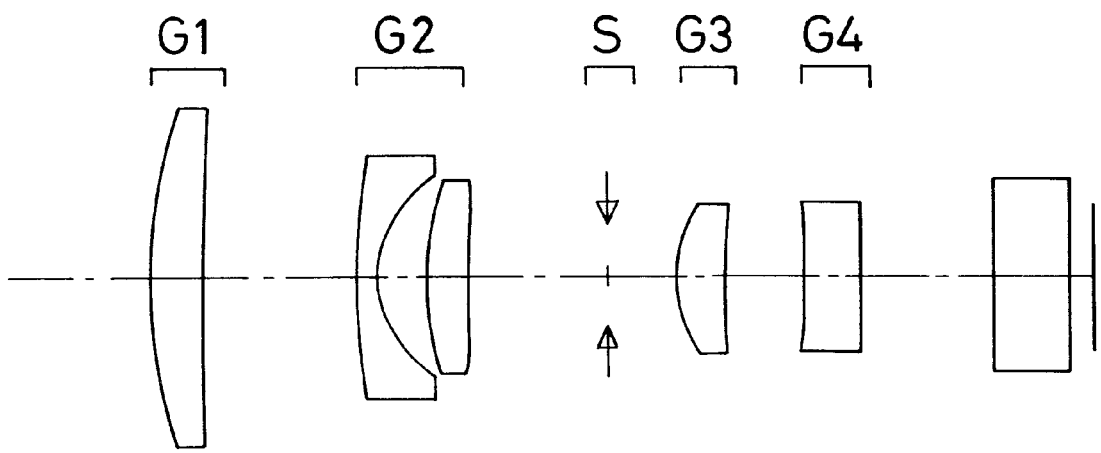
Figure 1C:
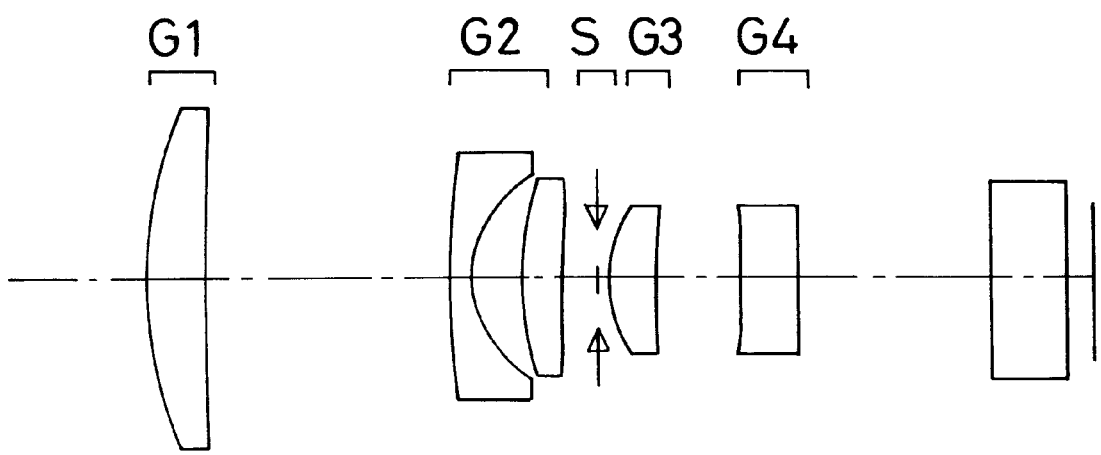
Figure 2:
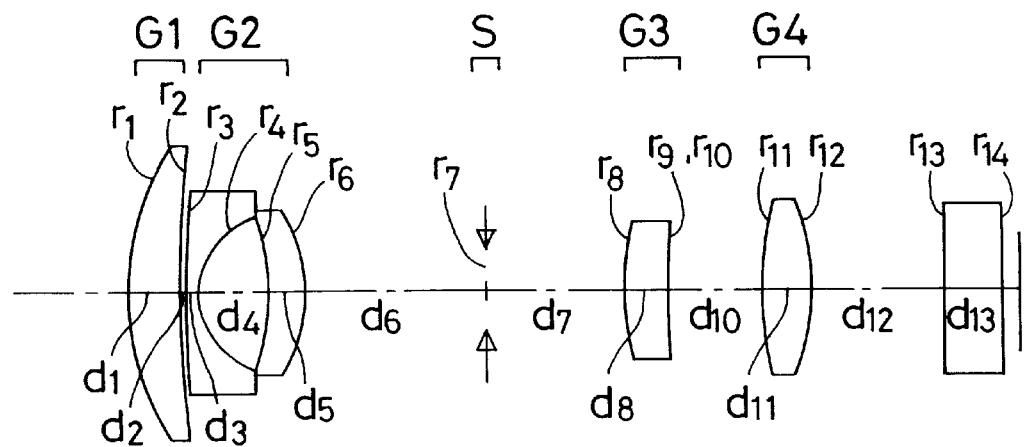
FIG. 2 is a sectional schematic of Example 2 of the zoom lens system according to the present invention at a wide-angle end thereof, as taken along an optical axis thereof.

As shown in FIG. 2, Example 2 is directed to a zoom lens system constructed of, in order from an object side thereof, a first lens group G1 consisting of one positive meniscus lens convex on the object side, a second lens group G2 consisting of a negative meniscus lens convex on the object side and a positive meniscus lens convex on an image side of the zoom lens system and having the largest zooming action, a stop S, a third lens group G3 made up of a DOE consisting of a positive meniscus lens convex on the object side with a diffractive surface fabricated on a surface thereof located on the image side, and a fourth lens group G4 consisting of one double-convex lens. From a wide-angle end to a telephoto end of the zoom lens system, the second group G2 moves toward the image side and the third and fourth lens groups G3 and G4 move toward the object side while the first lens group G1 and the stop S remain fixed. Four aspherical surfaces are used, one on a surface in the second lens group G2, which surface is located nearest to the image side, two on both sides of the third lens group G3 and one on a surface in the fourth lens group G4, which surface is located on the object side. The zoom lens system of this example has a zoom ratio of 3, and achieves very satisfactory image formation capabilities with fourth lens groups or five lenses. In three states, i.e., the wide-angle, intermediate and telephoto states, the angle between a chief ray and the normal to the diffractive surface is about 9.1° at the maximum. The number of gratings included in an axial ray bundle is 34 at the wide-angle end, and 24 at the telephoto end.

Figure 3:
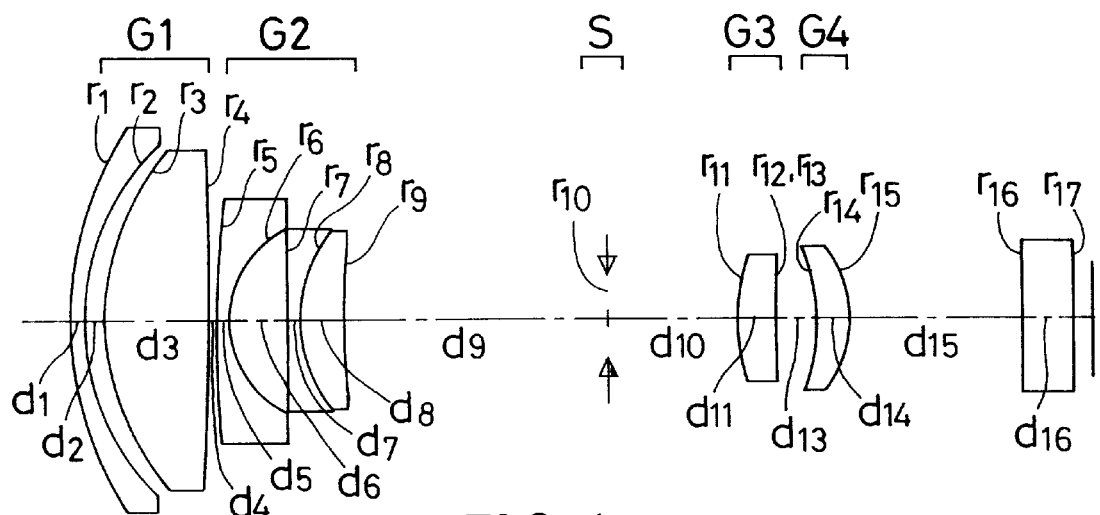
FIG. 3 is a sectional schematic of Example 3 of the zoom lens system according to the present invention at a wide-angle end thereof, as taken along an optical axis thereof.

As shown in FIG. 3, Example 3 is directed to a zoom lens system constructed of, in order from an object side thereof, a first lens group G1 consisting of a negative meniscus lens convex on the object side and a double-convex positive lens, a second lens group G2 made up of a doublet consisting of a negative meniscus lens convex on the object side and a positive meniscus lens convex on the object side and having the largest zooming action, a stop S, a third lens group G3 made up of a DOE consisting of a positive meniscus lens convex on the object side with a diffractive surface fabricated on a surface thereof located on an image side of the zoom lens system, and a fourth lens group G4 consisting of a positive meniscus lens convex on the image side. From a wide-angle end to a telephoto end of the zoom lens system, the second group G2 moves toward the image side and the third and fourth lens groups G3 and G4 move toward the object side while the first lens group G1 and the stop S remain fixed. Four aspherical surfaces are used, one on a surface in the second lens group G2, which surface is located nearest to the image side, two on both sides of the third lens group G3 and one on a surface in the fourth lens group G4, which surface is located on the object side. The zoom lens system of this example has a zoom ratio of 6.

The angle between a chief ray and the normal to the diffractive surface is about 6.5° at the maximum, and the number of gratings included in an axial ray bundle is 38 at the wide-angle end, and 27 at the telephoto end.

Figure 4:
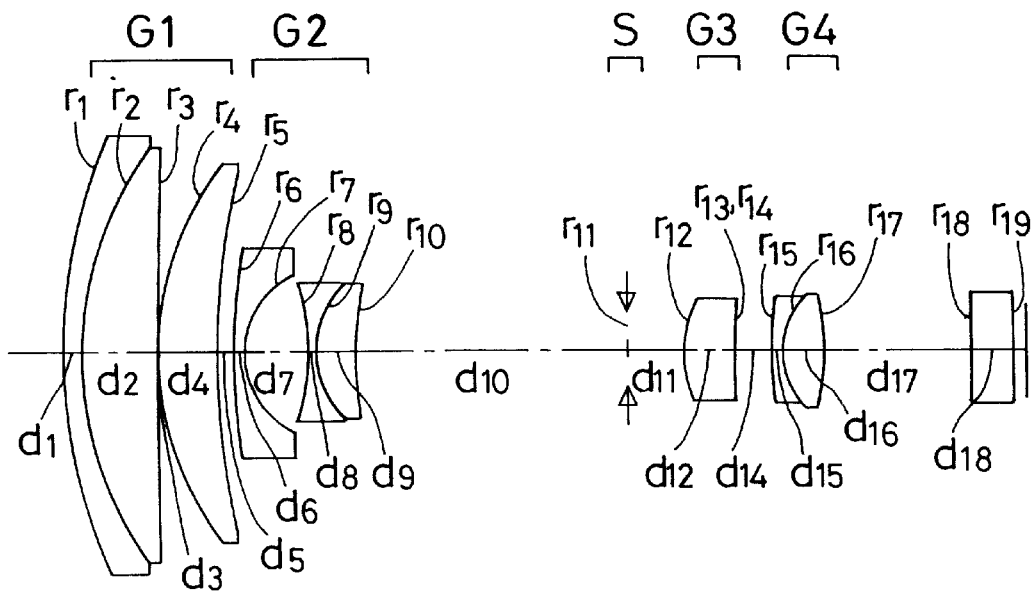
FIG. 4 is a sectional schematic of Example 4 of the zoom lens system according to the present invention at a wide-angle end thereof, as taken along an optical axis thereof.

Example 4 is directed to a zoom lens system consisting of four lens groups or nine lenses. As shown in FIG. 4, the zoom lens system is constructed of, in order from an object side thereof, a first lens group G1 made up of a doublet consisting of a negative meniscus lens convex on the object side and a positive meniscus lens convex on the object side and a positive meniscus lens convex on the object side, a second lens group G2 made up of a doublet consisting of a double-concave negative lens and a positive meniscus lens convex on the object side, a stop S, a third lens group G3 If made up of a DOE consisting of a positive meniscus lens convex on the object side with a diffractive surface fabricated on a surface thereof located on an image side of the zoom lens system, and a fourth lens group G4 made up of a doublet consisting of a negative meniscus lens convex on the object side and a double-convex positive lens. From a wide-angle end to a telephoto end of the zoom lens system, the second group G2 moves toward the image side and the third and fourth lens groups G3 and G4 move toward the object side while the first lens group $G_1$ and the stop S remain fixed. Aspherical surfaces are used on both surfaces of the third lens group G3. The zoom lens system of this example has a zoom ratio of 10. By designing the third lens group G3 to move for zooming, the size of the lens system can be achieved.

The angle between a chief ray and the normal to the diffractive surface is about 7.0° at the maximum, and the number of gratings included in an axial ray bundle is 17 at the wide-angle end, and 26 at the telephoto end.

Figure 5:
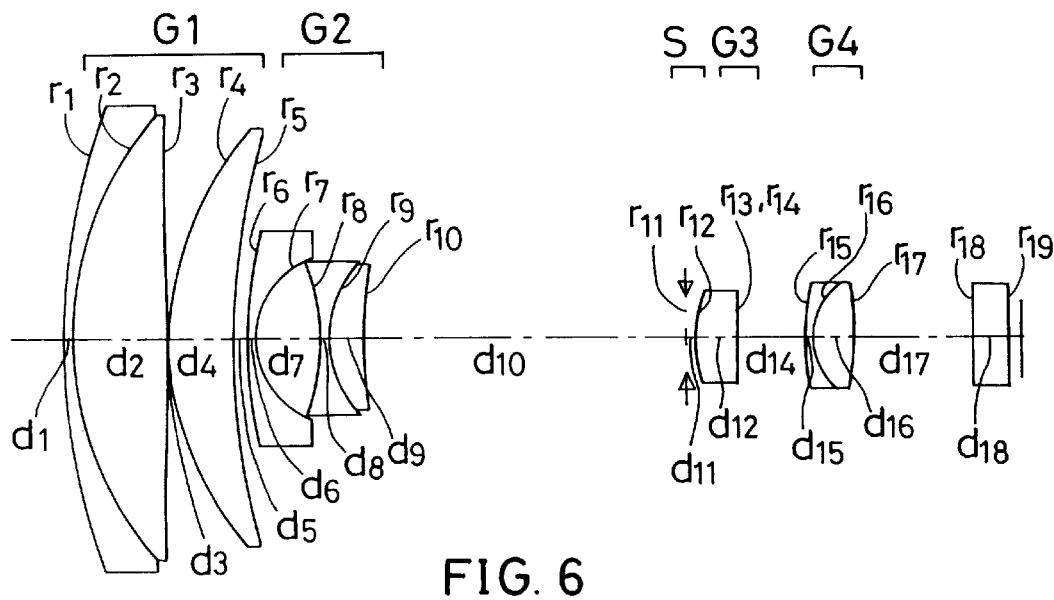
FIG. 5 is a sectional schematic of Example 5 of the zoom lens system according to the present invention at a wide-angle end thereof, as taken along an optical axis thereof.

Example 5 is directed to a zoom lens system constructed of fourth lens groups or nine lenses. As shown in FIG. 5, the zoom lens system is constructed of, in order from an object side thereof, a first lens group G1 made up of a doublet consisting of a negative meniscus lens convex on the object side and a double-convex positive lens and a positive meniscus lens convex on the object side, a second lens group G2 made up of a negative meniscus lens convex on the object side and a doublet consisting of a double-concave negative lens and a positive meniscus lens convex on the object side and having the largest zooming action, a stop S, a third lens group G3 made up of a DOE consisting of a positive meniscus lens convex on the object side with a diffractive surface fabricated on a surface thereof located on an image side of the zoom lens system, and a fourth lens group G4 made up of a doublet consisting of a negative meniscus lens convex on the object side and a double-convex positive lens. From a wide-angle end to a telephoto end of the zoom lens system, the second group G2 moves toward the image side and the fourth lens group G4 moves toward the object side while the first lens group G1, the stop S and the third lens group G3 remain fixed. Aspherical surfaces are used on both surfaces of the third lens group G3. The zoom lens system of this example has a zoom ratio of 10. Since the third lens group G3 is fixed with respect to an image plane, it is possible to simplify the construction of a lens barrel. The angle between a chief ray and the normal to the diffractive surface is about 7.1° at the maximum, and the number of gratings included in an axial ray bundle is 13 at the wide-angle end, and 14 at the telephoto end.

Figure 6:
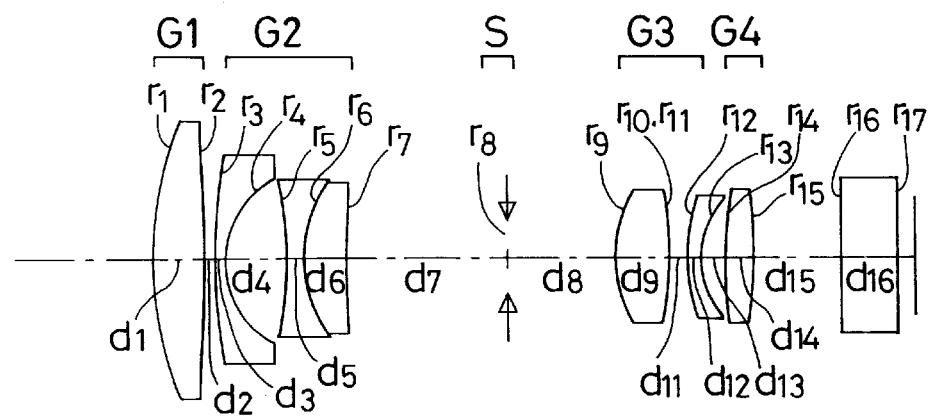
FIG. 6 is a sectional schematic of Example 6 of the zoom lens system according to the present invention at a wide-angle end thereof, as taken along an optical axis thereof.

Example 6 is directed to a zoom lens system made up of four lens groups or seven lenses. As shown in FIG. 6, the zoom lens system is constructed of, in order from an object side thereof, a first lens group G1 made up of one double-convex positive lens, a second lens group G2 made up of a negative meniscus lens convex on the object side and a doublet consisting of a double-concave negative lens and a positive meniscus lens convex on the object side and having the largest zooming action, a stop S, a third lens group G3 made up of a DOE consisting of a double-convex positive lens with a diffractive surface fabricated on a surface thereof located on an image side of the zoom lens system, and a fourth lens group G4 made up of one double-convex positive lens. From a wide-angle end to a telephoto end of the zoom lens system, the second group G2 moves toward the image side and the third and fourth lens groups G3 and G4 move toward the object side while the first lens group G1 and the stop S remain fixed. Aspherical surfaces are used on both surfaces of the double-convex positive lens in the third lens group G3. The zoom lens system of this example has a zoom ratio of 3. The angle between a chief ray and the normal to the diffractive surface is about 4.8° at the maximum, and the number of gratings included in an axial ray bundle is 12 at the wide-angle end, and 9 at the telephoto end.

Figure 7:
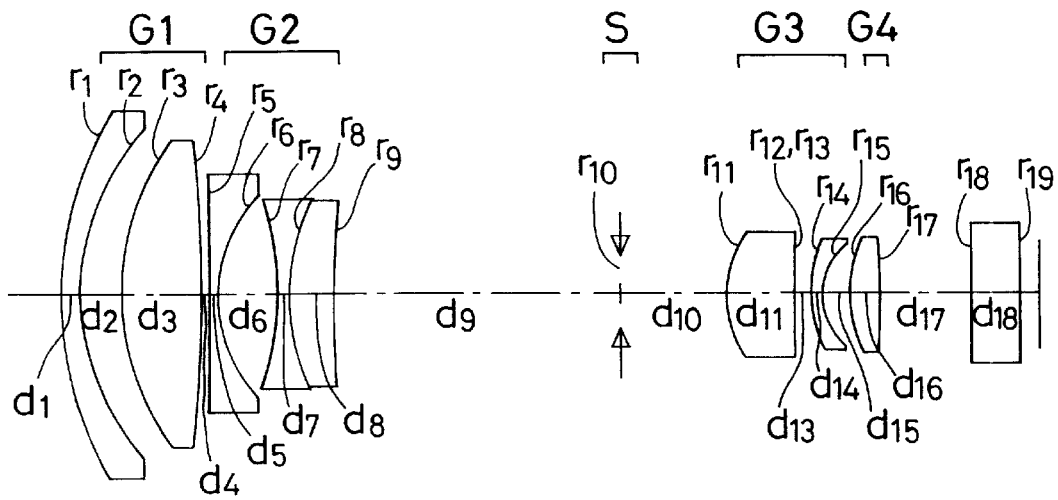
FIG. 7 is a sectional schematic of Example 7 of the zoom lens system according to the present invention at a wide-angle end thereof, as taken along an optical axis thereof.

Example 7 is directed to a zoom lens system made up of four groups or eight lenses. As shown in FIG. 7, the zoom lens system is constructed of, in order from an object side thereof, a first lens group G1 consisting of a negative meniscus lens convex on the object side and a double-convex positive lens, a second lens group G2 made up of a negative meniscus lens convex on the object side and a doublet consisting of a double-concave negative lens and a positive meniscus lens convex on the object side and having the largest zooming action, a stop S, a third lens group G3 made up of a DOE consisting of a positive meniscus lens convex on the object side with a diffractive surface fabricated on a surface thereof located on an image side of the zoom lens system and a negative meniscus lens convex on the object side, and a fourth lens group G4 made up of one double-convex positive lens. From a wide-angle end to a telephoto end of the zoom lens system, the second group G2 moves toward the image side and the third and fourth lens groups G3 and G4 move toward the object side while the first lens group G1 and the stop S remain fixed. Aspherical surfaces are used on both surfaces of the double-convex positive lens in the third lens group G3. The zoom lens system of this example has a zoom ratio of 6. The angle between a chief ray and the normal to the diffractive surface is about 6.2° at the maximum, and the number of gratings included in an axial ray bundle is 11 at the wide-angle end, and 9 at the telephoto end.

Figure 8:
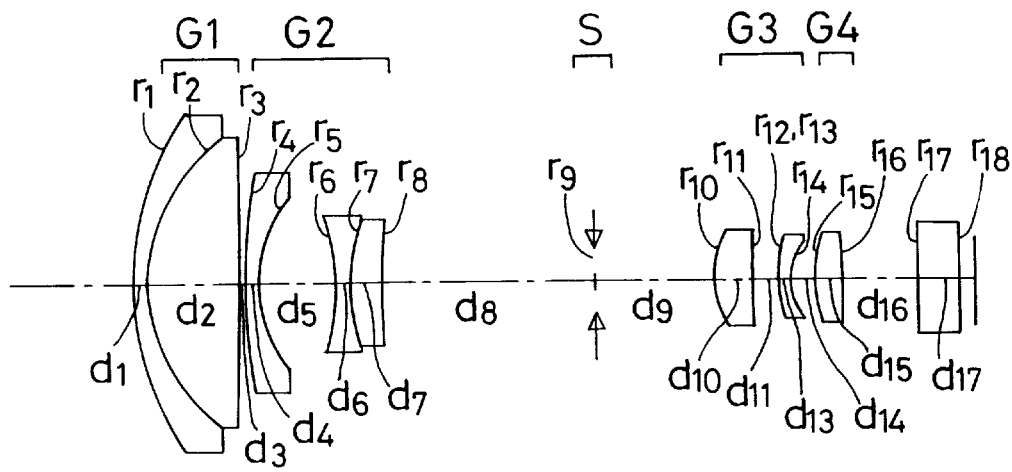
FIG. 8 is a sectional schematic of Example 8 of the zoom lens system according to the present invention at a wide-angle end thereof, as taken along an optical axis thereof.

Example 8 is directed to a zoom lens system made up of four groups or eight lenses. As shown in FIG. 8, the zoom lens system is constructed of, in order from an object side thereof, a first lens group G1 made up of a doublet consisting of a negative meniscus lens convex on the object side and a double-convex positive lens, a second lens group G2 made up of a doublet consisting of a double-concave lens and a positive meniscus lens convex on the object side and having the largest zooming action, a stop S, a third lens group G3 made up of a positive meniscus lens convex on the object side and a DOE consisting of a negative meniscus lens convex on the object side with a diffractive surface fabricated on a surface thereof located on an image side of the zoom lens system, and a fourth lens group G4 made up of one double-convex positive lens. From a wide-angle end to a telephoto end of the zoom lens system, the second group G2 moves toward the image side and the third and fourth lens groups G3 and G4 move toward the object side while the first lens group G1 and the stop S remain fixed. Two aspherical surfaces are used on both surfaces of the positive meniscus lens in the third lens group G3, and one aspherical surface is used on an object-side surface of the negative meniscus lens in the third lens group G3. The zoom lens system of this example has a zoom ratio of 6. The angle between a chief ray and the normal to the diffractive surface is about 16.8° at the maximum, and the number of gratings included in an axial ray bundle is 9 at the wide-angle end, and 6 at the telephoto end.

Figure 9:
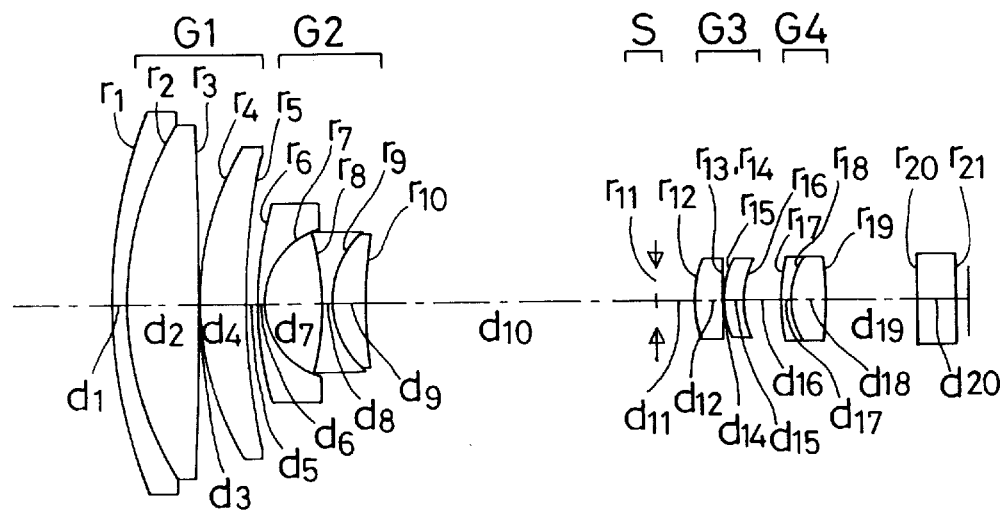
FIG. 9 is a sectional schematic of Example 9 of the zoom lens system according to the present invention at a wide-angle end thereof, as taken along an optical axis thereof.

Example 9 is directed to a zoom lens system made up of four lens groups or ten lenses. As shown in FIG. 9, the zoom lens system is constructed of, in order from an object side thereof, a first lens group G1 made up of a doublet consisting of a negative meniscus lens convex on the object side and a double-convex positive lens and a positive meniscus lens convex on the object side, a second lens group G2 made up of a negative meniscus lens convex on the object side and a doublet consisting of a double-concave lens and a positive meniscus lens convex on the object side and having the largest zooming action, a stop S, a third lens group G3 made up of a DOE consisting of a double-convex lens with a diffractive surface fabricated on a surface thereof located on an image side of the zoom lens system and a negative meniscus lens convex on the object side, and a fourth lens group G4 a doublet consisting of a negative meniscus lens convex on the object side and a double-convex positive lens. From a wide-angle end to a telephoto end of the zoom lens system, the second group G2 moves toward the image side and the third and fourth lens groups G3 and G4 move toward the object side while the first lens group G1 and the stop S remain fixed. Aspherical surfaces are used on both surfaces of the double-convex positive lens in the third lens group G3. The zoom lens system of this example has a zoom ratio of 10. The angle between a chief ray and the normal to the diffractive surface is about 5.5° at the maximum, and the number of gratings included in an axial ray bundle is 12 at the wide-angle end, and 11 at the telephoto end.

Figure 10:
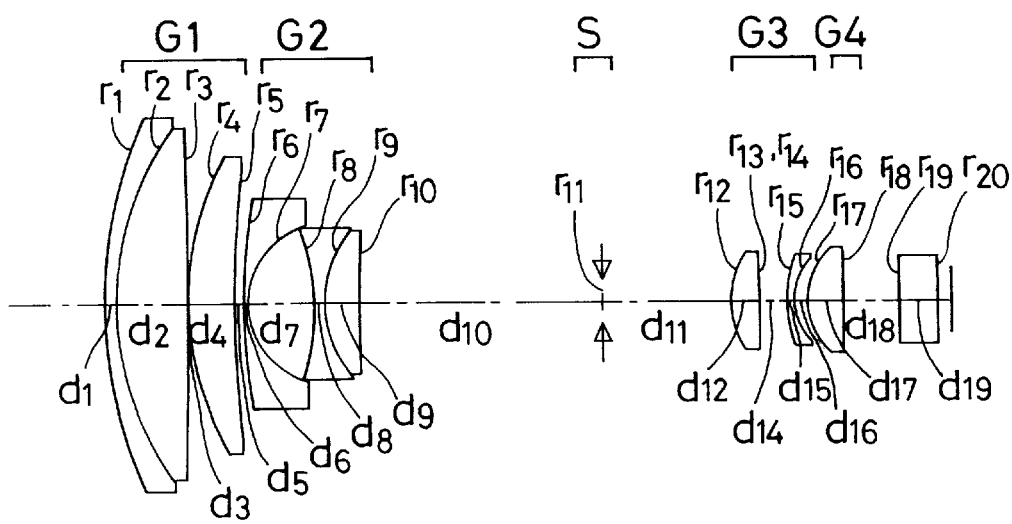
FIG. 10 is a sectional schematic of Example 10 of the zoom lens system according to the present invention at a wide-angle end thereof, as taken along an optical axis thereof.

Example 10 is directed to a zoom lens system made up of four lens groups or nine lenses. As shown in FIG. 10, the zoom lens system is constructed of, in order from an object side thereof, a first lens group G1 made up of a doublet consisting of a negative meniscus lens convex on the object side and a positive meniscus lens convex on the object side and a positive meniscus lens convex on the object side, a second lens group G2 made up of a doublet consisting of a double-concave lens and a positive meniscus lens convex on the object side, a stop S, a third lens group G3 made up of a DOE consisting of a double-convex lens with a diffractive surface fabricated on a surface thereof located on an image side of the zoom lens system, and a fourth lens group G4 a positive meniscus lens convex on the object side. From a wide-angle end to a telephoto end of the zoom lens system, the second lens group G2 moves toward the image side, the third lens group G3 moves toward the object side, and the fourth lens group G4 moves toward the object side from the wide-angle end to an intermediate focal length and toward the image side from the intermediate focal length to the telephoto end while the first lens group G1 and the stop S remain fixed. Two aspherical surfaces are used on both surfaces of the double-convex positive lens in the third lens group G3, and one aspherical surface is used on a surface in the fourth lens group G4, which surface is located on the image side. The zoom lens system of this example has a zoom ratio of 10. The angle between a chief ray and the normal to the diffractive surface is about 5.0° at the maximum, and the number of gratings included in an axial ray bundle is 9 at the wide-angle end, and 6 at the telephoto end.

Figure 11:
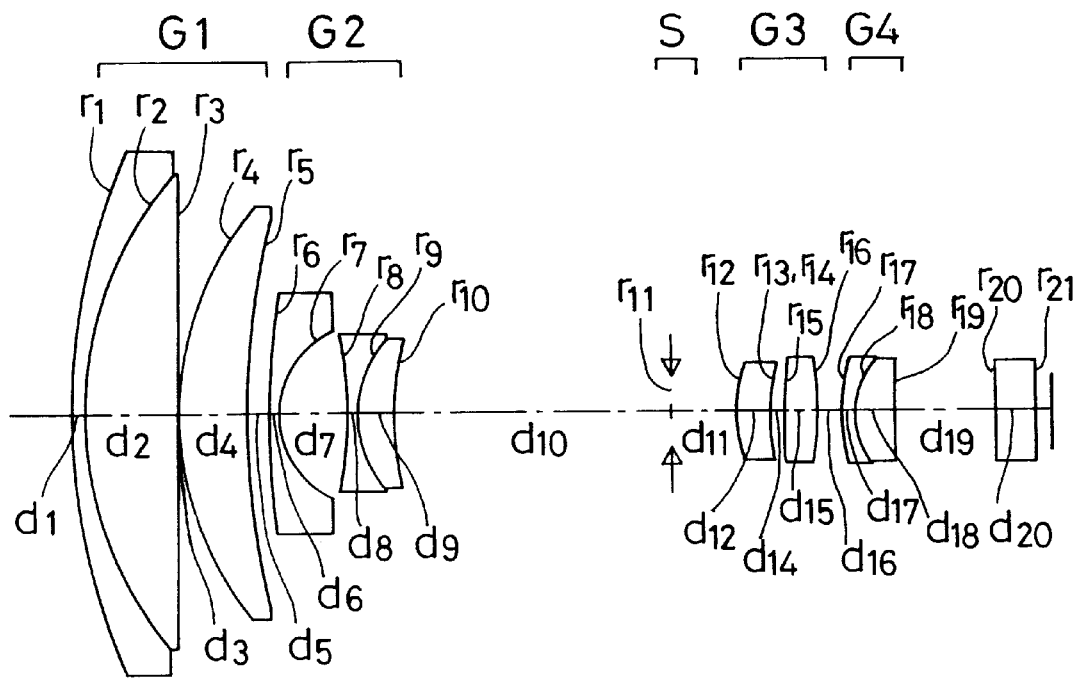
FIG. 11 is a sectional schematic of Example 11 of the zoom lens system according to the present invention at a wide-angle end thereof, as taken along an optical axis thereof.

Example 11 is directed to a zoom lens system made up of four lens groups or ten lenses. As shown in FIG. 11, the zoom lens system is constructed of, in order from an object side thereof, a first lens group G1 made up of a doublet consisting of a negative meniscus lens convex on the object side and a positive meniscus lens convex on the object side and a positive meniscus lens convex on the object side, a second lens group G2 made up of a negative meniscus lens convex on the object side and a doublet consisting of a double-concave lens and a positive meniscus lens convex on the object side and having the largest zooming action, a stop S, a third lens group G3 made up of a DOE consisting of a positive meniscus lens convex on the object side with a diffractive surface fabricated on a surface thereof on an image side of the zoom lens system and a double-convex positive lens, and a fourth lens group G4 made up of a doublet consisting of a negative meniscus lens convex on the object side and a positive meniscus lens convex on the object side. From a wide-angle end to a telephoto end of the zoom lens system, the second lens group G2 moves toward the image side, the third lens group G3 moves toward the object side, and the fourth lens group G4 moves toward the object side from the wide-angle end to an intermediate focal length and toward the image side from the intermediate focal length to the telephoto end while the first lens group G1 and the stop S remain fixed. Two aspherical surfaces are used on both surfaces of the positive meniscus lens in the third lens group G3. The zoom lens system of this example has a zoom ratio of 10. The angle between a chief ray and the normal to the diffractive surface is about 11.1° at the maximum, and the number of gratings included in an axial ray bundle is 8 at the wide-angle end, and 7 at the telephoto end.

Figure 12:
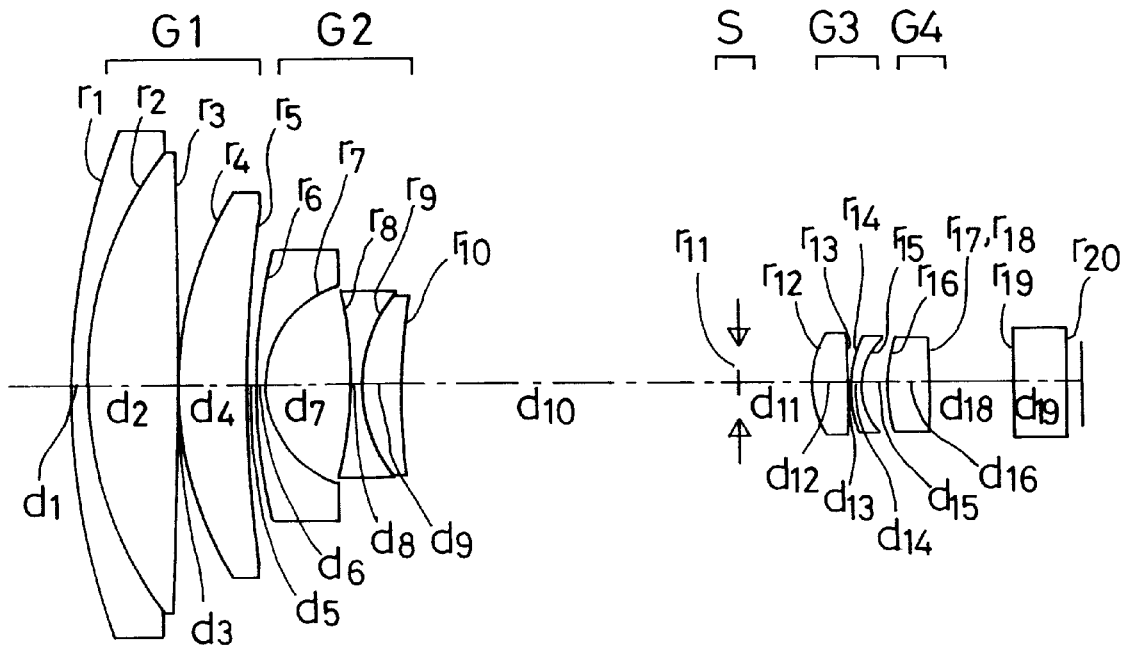
FIG. 12 is a sectional schematic of Example 12 of the zoom lens system according to the present invention at a wide-angle end thereof, as taken along an optical axis thereof.
Figure 17:
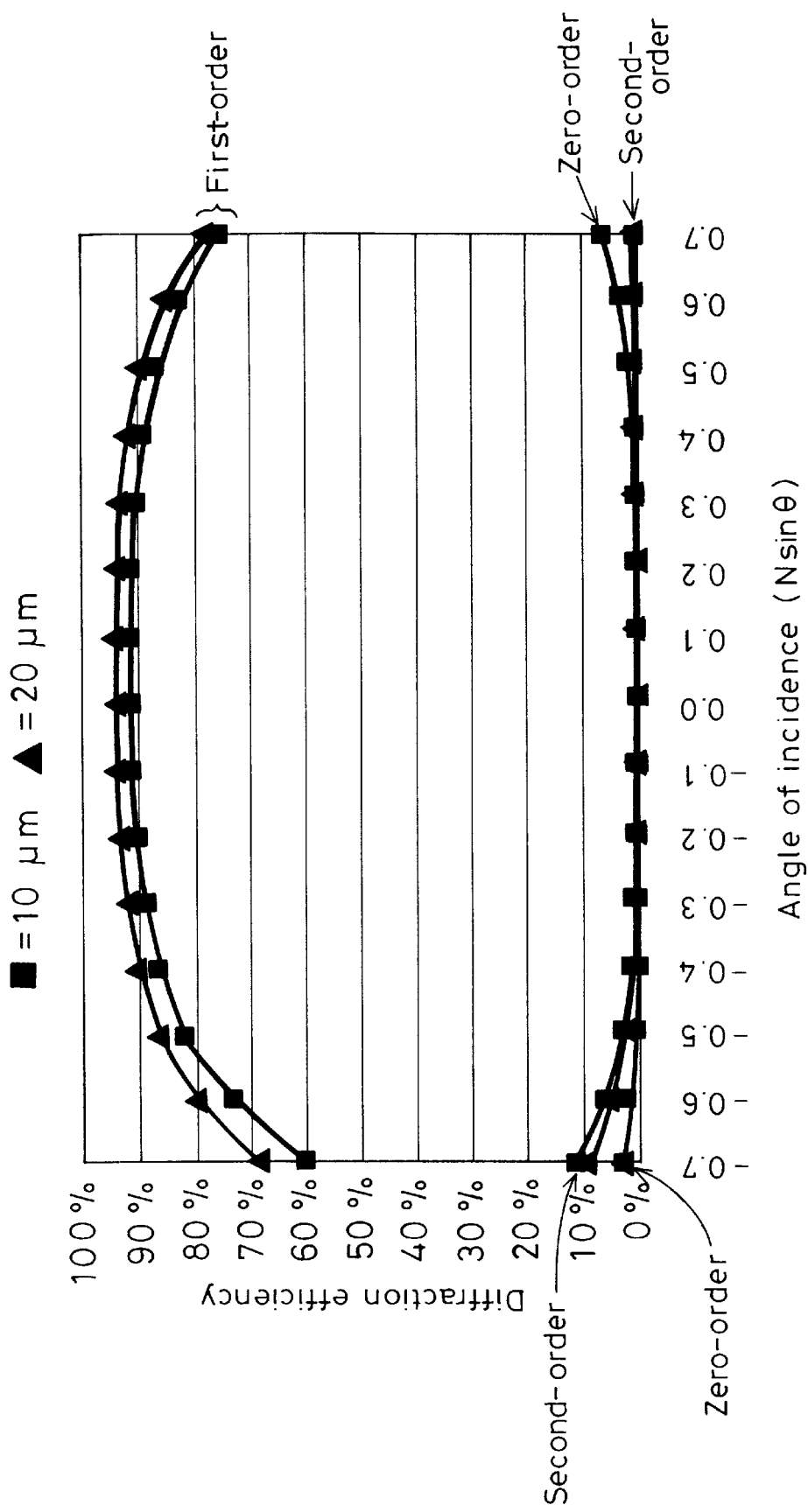
FIG. 17 is a graphical representation of the angle-of-incidence dependence of diffraction efficiency for each order-of-diffraction light at e-line.
Figure 18:
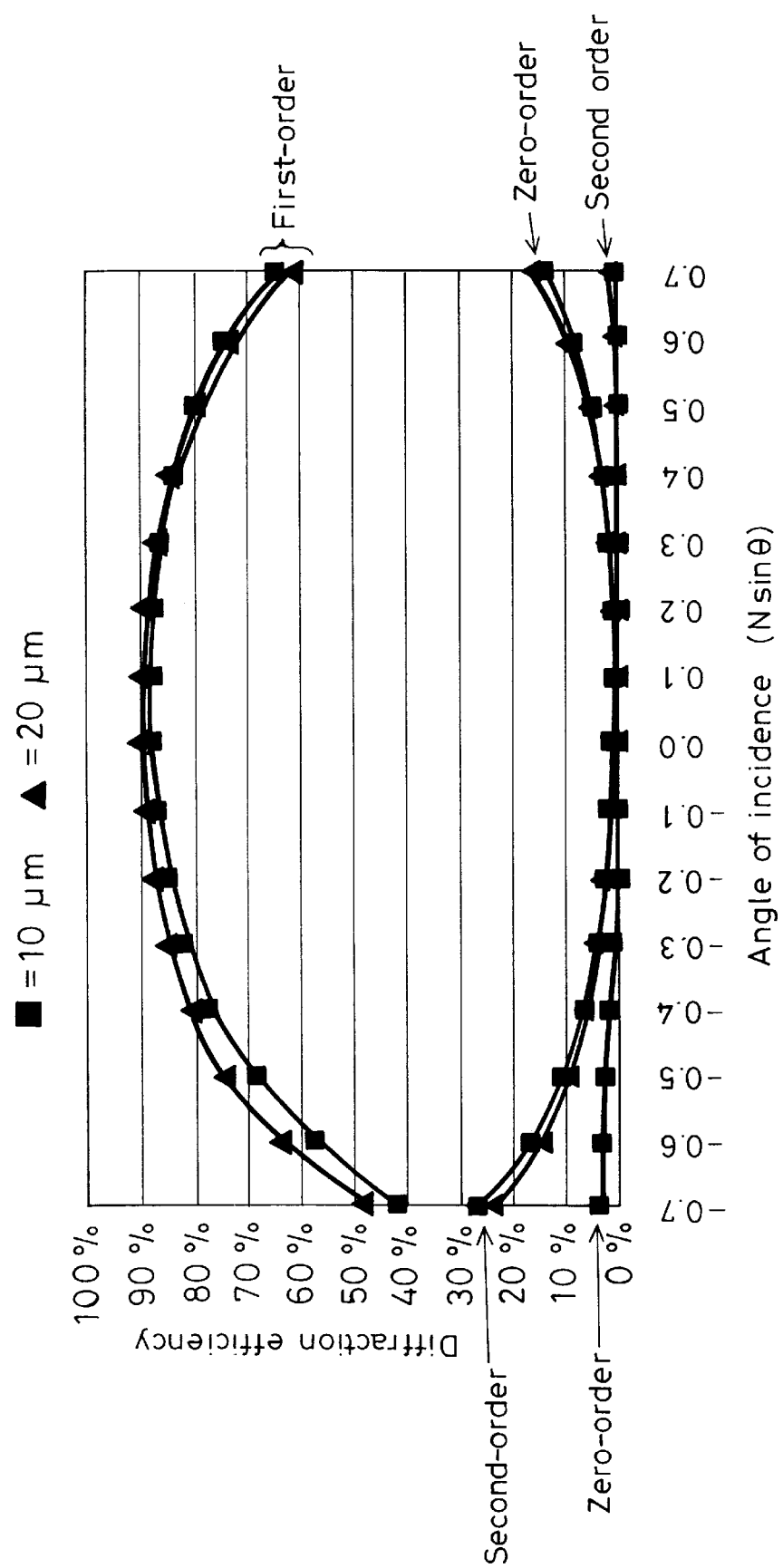
FIG. 18 is a graphical representation of the angle-of-incidence dependence of diffraction efficiency for each order-of-diffraction light at F-line.

Example 12 is directed to a zoom lens system made up of four lens groups or nine lenses. As shown in FIG. 12, the zoom lens system is constructed of, in order from an object side thereof, a first lens group G1 made up of a doublet consisting of a negative meniscus lens convex on the object side and a double-convex positive lens and a positive meniscus lens convex on the object side, a second lens group G2 made up of a negative meniscus lens convex on the object side and a doublet consisting of a double-concave negative lens and a positive meniscus lens convex on the object side and having the largest zooming action, a stop S, a third lens group G3 made up of a double-convex positive lens and a negative meniscus lens convex on the object side, and a fourth lens group G4 made up of a DOE consisting of a positive meniscus lens convex on the object side with a diffractive surface fabricated on a surface thereof on an image side of the zoom lens system. From a wide-angle end to a telephoto end of the zoom lens system, the second lens group G2 moves toward the image side, the third lens group G3 moves toward the object side, and the fourth lens group G4 moves toward the object side from the wide-angle end to an intermediate focal length and toward the image side from the intermediate focal length to the telephoto end while the first lens group G1 and the stop S remain fixed. Two aspherical surfaces are used on both surfaces of the double-convex positive lens in the third lens group G3, and one aspherical surface is used on an image-side surface of the positive meniscus lens in the fourth lens group G4. The zoom lens system of this example has a zoom ratio of 10. The angle between a chief ray and the normal to the diffractive surface is about 5.2° at the maximum, and the number of gratings included in an axial ray bundle is 9 at the wide-angle end, and 6 at the telephoto end.

Enumerated below are numerical data about each of Examples 1 to 12. Symbols hereinafter used but not hereinbefore have the following meanings.

f . . . focal length, $F_{NO}$ . . . F-number, $2\omega$ . . . angle of view, $r_1$, $r_2$ . . . radius of curvature of each lens surface, $d_1$, $d_2$ . . . separation between adjacent lens surfaces, $n_{d1}$, $nd_2$, . . . d-line refractive index of each lens, and $v_{d1}$, $v_{d2}$ . . . d-line Abbe's number of each lens.

Aspherical shape is given by the aforesaid equation (a), and the diffractive surface is represented by "Dif.sur".

EXAMPLE 1 f = 5.56~9.00~15.75
$F_{NO}$ = 2.8~3.2~4.1
$2\omega$ = 57.7°~37.6°~22.0°

| | | | |
|---|---|---|---|
| $r_1$ = 21.119 | $d_1$ = 2.22 | $n_{d1}$ = 1.48749 | $v_{d1}$ = 70.23 |
| $r_2$ = 137.558 | $d_2$ = (Variable) | | |
| $r_3$ = 52.305 | $d_3$ = 0.84 | $n_{d2}$ = 1.77250 | $v_{d2}$ = 49.60 |
| $r_4$ = 4.848 | $d_4$ = 2.00 | | |
| $r_5$ = 12.784 | $d_5$ = 1.71 | $n_{d3}$ = 1.80518 | $v_{d3}$ = 25.42 |
| $r_6$ = 35.162 (Aspheric) | $d_6$ = (Variable) | | |
| $r_7$ = ∞ (Stop) | $d_7$ = (Variable) | | |
| $r_8$ = 6.073 | $d_8$ = 1.82 | $n_{d4}$ = 1.69680 | $v_{d4}$ = 55.53 |
| $r_9$ = 26.059783 | $d_9$ = 0.00 | $n_{d5}$ = 1001.00 | $v_{d5}$ = −3.45 |
| $r_{10}$ = 26.066068 (Dif. sur.) | $d_{10}$ = (Variable) | | |
| $r_{11}$ = 52.926 (Aspheric) | $d_{11}$ = 2.50 | $n_{d6}$ = 1.63980 | $v_{d6}$ = 34.46 |
| $r_{12}$ = −321.441 | $d_{12}$ = (Variable) | | |
| $r_{13}$ = ∞ | $d_{13}$ = 3.20 | $n_{d7}$ = 1.51633 | $v_{d7}$ = 64.14 |
| $r_{14}$ = ∞ | | | |

Zooming Spaces

| f | 5.56 | 9.00 | 15.75 |
|---|---|---|---|
| $d_2$ | 0.862 | 6.719 | 10.548 |

-continued

| | | | |
|---|---|---|---|
| $d_6$ | 11.477 | 5.820 | 1.591 |
| $d_7$ | 4.411 | 2.984 | 0.500 |
| $d_{10}$ | 3.309 | 3.329 | 3.438 |
| $d_{12}$ | 4.112 | 5.419 | 7.994 |

Aspherical Coefficients
6th surface
K=0.00
$A_4=-3.9503\times10^{-4}$
$A_6=-1.9327\times10^{-5}$
$A_8=3.1437\times10^{-7}$
$A_{10}=-2.4940\times10^{-8}$
10th surface
K=−1.00
$A_4=7.1073\times10^{-6}$
$A_6=4.0701\times10^{-8}$
$A_8=-6.2062\times10^{-9}$
$A_{10}=3.3316\times10^{-10}$
11th surface
K=0.00
$A_4=-1.5880\times10^{-3}$
$A_6=9.7826\times10^{-6}$
$A_8=-1.1786\times10^{-5}$
$A_{10}=4.8219\times10^{-7}$
$f_{DOE}=108.079$
$R_{a1}/f_S=0.649$
$f_a/f_{DOE}=0.093$
$f_S/f_a=0.93$
$S_{DOE}=-1.608$

EXAMPLE 2

| | f = 5.05~10.01~15.00 | | |
|---|---|---|---|
| | $F_{NO}$ = 2.8~3.3~3.8 | | |
| | 2ω = 62.4°~34.0°~23.1° | | |
| $r_1$ = 14.787 | $d_1$ = 2.64 | $n_{d1}$ = 1.69400 | $v_{d1}$ = 56.29 |
| $r_2$ = 61.456 | $d_2$ = (Variable) | | |
| $r_3$ = 56.671 | $d_3$ = 0.75 | $n_{d2}$ = 1.77250 | $v_{d2}$ = 49.60 |
| $r_4$ = 4.113 | $d_4$ = 3.72 | | |
| $r_5$ = −13.304 | $d_5$ = 1.98 | $n_{d3}$ = 1.72250 | $v_{d3}$ = 29.23 |
| $r_6$ = −8.558 (Aspheric) | $d_6$ = (Variable) | | |
| $r_7$ = ∞ (Stop) | $d_7$ = (Variable) | | |
| $r_8$ = 12.064 (Aspheric) | $d_8$ = 2.40 | $n_{d4}$ = 1.66910 | $v_{d4}$ = 55.39 |
| $r_9$ = 36.431660 (Aspheric) | $d_9$ = 0.00 | $n_{d5}$ = 1001.00 | $v_{d5}$ = −3.45 |
| $r_{10}$ = 36.442202 (Dif. sur.) | $d_{10}$ = (Variable) | | |
| $r_{11}$ = 17.082 (Aspheric) | $d_{11}$ = 2.37 | $n_{d6}$ = 1.56384 | $v_{d6}$ = 60.67 |
| $r_{12}$ = −15.633 | $d_{12}$ = (Variable) | | |
| $r_{13}$ = ∞ | $d_{13}$ = 2.86 | $n_{d7}$ = 1.51633 | $v_{d7}$ = 64.14 |
| $r_{14}$ = ∞ | | | |

Zooming Spaces

| f | 5.05 | 10.01 | 15.00 |
|---|---|---|---|
| $d_2$ | 0.317 | 6.336 | 9.022 |
| $d_6$ | 9.420 | 3.601 | 0.716 |
| $d_7$ | 7.063 | 3.204 | 0.500 |
| $d_{10}$ | 4.917 | 8.172 | 10.826 |
| $d_{12}$ | 7.041 | 7.545 | 7.795 |

Aspherical Coefficients
6th surface
K=0.00
$A_4=-2.8613\times10^{-4}$
$A_6=-3.8304\times10^{-5}$
$A_8=2.5484\times10^{-6}$
$A_{10}=-1.2152\times10^{-7}$
8th surface
K=0.00
$A_4=-1.4991\times10^{-4}$
$A_6=1.3026\times10^{-5}$
$A_8=-8.1189\times10^{-7}$
$A_{10}=4.5379\times10^{-8}$
9th surface
K=−1.00
$A_4=1.5669\times10^{-8}$
$A_6=-1.9953\times10^{-9}$
$A_8=1.5863\times10^{-9}$
$A_{10}=-5.8291\times10^{-11}$
10th surface
K=−1.00
$A_4=-4.2614\times10^{-8}$
$A_6=9.5977\times10^{-9}$
$A_8=8.2619\times10^{-10}$
$A_{10}=-2.3733\times10^{-11}$
11th surface
K=0.00
$A_4=-2.6923\times10^{-4}$
$A_6=-3.0925\times10^{-6}$
$A_8=1.8928\times10^{-7}$
$A_{10}=-4.4111\times10^{-9}$
$f_{DOE}=125.939$
$R_{a1}/f_S=1.386$
$f_a/f_{DOE}=0.173$
$f_S/f_a=0.40$
$S_{DOE}=-1.990$

EXAMPLE 3

| | f = 5.05~15.00~30.00 | | |
|---|---|---|---|
| | $F_{NO}$ = 2.8~3.3~4.3 | | |
| | 2ω = 62.4°~23.1°~11.6° | | |
| $r_1$ = 19.496 | $d_1$ = 0.80 | $n_{d1}$ = 1.84666 | $v_{d1}$ = 23.78 |
| $r_2$ = 13.251 | $d_2$ = 1.01 | | |
| $r_3$ = 13.938 | $d_3$ = 5.81 | $n_{d2}$ = 1.67003 | $v_{d2}$ = 47.23 |
| $r_4$ = −1231.212 | $d_4$ = (Variable) | | |
| $r_5$ = 66.818 | $d_5$ = 0.75 | $n_{d3}$ = 1.77250 | $v_{d3}$ = 49.60 |
| $r_6$ = 5.685 | $d_6$ = 3.23 | | |
| $r_7$ = 235.231 | $d_7$ = 0.75 | $n_{d4}$ = 1.48749 | $v_{d4}$ = 70.23 |
| $r_8$ = 7.631 | $d_8$ = 2.37 | $n_{d5}$ = 1.72250 | $v_{d5}$ = 29.23 |
| $r_9$ = 25.289 (Aspheric) | $d_9$ = (Variable) | | |
| $r_{10}$ = ∞ (Stop) | $d_{10}$ = (Variable) | | |
| $r_{11}$ = 10.026 (Aspheric) | $d_{11}$ = 2.20 | $n_{d6}$ = 1.69400 | $v_{d6}$ = 56.29 |
| $r_{12}$ = 49.493876 (Aspheric) | $d_{12}$ = 0.00 | $n_{d7}$ = 1001.00 | $v_{d7}$ = −3.45 |
| $r_{13}$ = 49.512979 (Dif. sur.) | $d_{13}$ = (Variable) | | |
| $r_{14}$ = −11.646 (Aspheric) | $d_{14}$ = 1.65 | $n_{d8}$ = 1.56384 | $v_{d8}$ = 60.67 |
| $r_{15}$ = −6.579 | $d_{15}$ = (Variable) | | |
| $r_{16}$ = ∞ | $d_{16}$ = 2.86 | $n_{d9}$ = 1.51633 | $v_{d9}$ = 64.14 |
| $r_{17}$ = ∞ | | | |

Zooming Spaces

| f | 5.05 | 15.00 | 30.00 |
|---|---|---|---|
| $d_4$ | 0.500 | 10.719 | 14.467 |

-continued

| | | | |
|---|---|---|---|
| $d_9$ | 14.723 | 4.505 | 0.756 |
| $d_{10}$ | 7.073 | 4.184 | 0.545 |
| $d_{13}$ | 2.369 | 3.077 | 5.416 |
| $d_{15}$ | 9.533 | 11.615 | 13.114 |

Aspherical Coefficients
9th surface
K=0.00
$A_4 = -1.4081 \times 10^{-4}$
$A_6 = -1.0162 \times 10^{-5}$
$A_8 = 4.2071 \times 10^{-7}$
$A_{10} = -1.0489 \times 10^{-8}$
11th surface
K=−0.2184
$A_4 = -9.2445 \times 10^{-5}$
$A_6 = -6.6290 \times 10^{-6}$
$A_8 = 4.8447 \times 10^{-7}$
$A_{10} = -6.8248 \times 10^{-9}$
12th surface
K=−1.00
$A_4 = -6.0421 \times 10^{-8}$
$A_6 = -1.7428 \times 10^{-9}$
$A_8 = 1.7086 \times 10^{-11}$
$A_{10} = -2.2958 \times 10^{-11}$
13th surface
K=−1.00
$A_4 = 3.3736 \times 10^{-9}$
$A_6 = -5.7307 \times 10^{-9}$
$A_8 = 4.9015 \times 10^{12}$
$A_{10} = -1.3667 \times 10^{-11}$
14th surface
K=0.00
$A_4 = -6.9203 \times 10^{-4}$
$A_6 = -5.2890 \times 10^{-6}$
$A_8 = -3.6556 \times 10^{-7}$
$A_{10} = 3.3110 \times 10^{-9}$
$f_{DOE} = 128.283$
$R_{a1}/f_S = 0.815$
$f_a/f_{DOE} = 0.123$
$f_S/f_a = 0.78$
$S_{DOE} = -1.508$

EXAMPLE 4

$f = 5.05 \sim 18.00 \sim 50.00$
$F_{NO} = 2.8 \sim 3.4 \sim 3.7$
$2\omega = 62.4° \sim 19.3° \sim 7.0°$

| | | | |
|---|---|---|---|
| $r_1 = 39.854$ | $d_1 = 1.00$ | $n_{d1} = 1.84666$ | $\nu_{d1} = 23.78$ |
| $r_2 = 25.354$ | $d_2 = 5.69$ | $n_{d2} = 1.60311$ | $\nu_{d2} = 60.64$ |
| $r_3 = 371.676$ | $d_3 = 0.15$ | | |
| $r_4 = 22.753$ | $d_4 = 4.14$ | $n_{d3} = 1.58913$ | $\nu_{d3} = 61.14$ |
| $r_5 = 54.692$ | $d_5 =$ (Variable) | | |
| $r_6 = 47.476$ | $d_6 = 0.80$ | $n_{d4} = 1.74400$ | $\nu_{d4} = 44.78$ |
| $r_7 = 6.022$ | $d_7 = 4.74$ | | |
| $r_8 = -18.579$ | $d_8 = 0.80$ | $n_{d5} = 1.51742$ | $\nu_{d5} = 52.43$ |
| $r_9 = 7.521$ | $d_9 = 2.67$ | $n_{d6} = 1.84666$ | $\nu_{d6} = 23.78$ |
| $r_{10} = 21.926$ | $d_{10} =$ (Variable) | | |
| $r_{11} = \infty$ (Stop) | $d_{11} =$ (Variable) | | |
| $r_{12} = 10.854$ (Aspheric) | $d_{12} = 3.55$ | $n_{d7} = 1.58913$ | $\nu_{d7} = 61.14$ |
| $r_{13} = 48.415478$ (Aspheric) | $d_{13} = 0.00$ | $n_{d8} = 1001.00$ | $\nu_{d8} = -3.45$ |
| $r_{14} = 48.423397$ (Dif. sur.) | $d_{14} =$ (Variable) | | |
| $r_{15} = 26.346$ | $d_{15} = 0.80$ | $n_{d9} = 1.74950$ | $\nu_{d9} = 35.28$ |
| $r_{16} = 5.731$ | $d_{16} = 3.00$ | $n_{d10} = 1.62230$ | $\nu_{d10} = 53.19$ |
| $r_{17} = -15.142$ | $d_{17} =$ (Variable) | | |
| $r_{18} = \infty$ | $d_{18} = 3.00$ | $n_{d11} = 1.51633$ | $\nu_{d11} = 64.14$ |
| $r_{19} = \infty$ | | | |

Zooming Spaces

| f | 5.05 | 18.00 | 50.00 |
|---|---|---|---|
| $d_5$ | 1.424 | 13.769 | 20.502 |
| $d_{10}$ | 20.240 | 7.895 | 1.162 |
| $d_{11}$ | 4.312 | 2.144 | 0.908 |
| $d_{14}$ | 2.827 | 0.800 | 0.927 |
| $d_{17}$ | 10.736 | 14.912 | 16.041 |

Aspherical Coefficients
12th surface
K=0.00
$A_4 = -7.3866 \times 10^{-7}$
$A_6 = -2.0618 \times 10^{-5}$
$A_8 = 1.6837 \times 10^{-6}$
$A_{10} = -6.6040 \times 10^{-8}$
13th surface
K=−1.00
$A_4 = -8.7129 \times 10^{-8}$
$A_6 = -4.8959 \times 10^{-9}$
$A_8 = 1.3102 \times 10^{-10}$
$A_{10} = -5.1545 \times 10^{-11}$
14th surface
K=−1.00
$A_4 = 3.0088 \times 10^{-8}$
$A_6 = -1.7653 \times 10^{-8}$
$A_8 = 1.1068 \times 10^{-9}$
$A_{10} = -9.4074 \times 10^{-11}$
$f_{DOE} = 296.0716$
$R_{a1}/f_S = 0.683$
$f_a/f_{DOE} = 0.072$
$f_S/f_a = 0.74$
$S_{DOE} = -1.578$

EXAMPLE 5

$f = 5.05 \sim 17.74 \sim 50.00$
$F_{NO} = 2.8 \sim 3.1 \sim 3.1$
$2\omega = 62.4° \sim 19.6° \sim 7.0°$

| | | | |
|---|---|---|---|
| $r_1 = 51.9402$ | $d_1 = 1.000$ | $n_{d1} = 1.76182$ | $\nu_{d1} = 26.52$ |
| $r_2 = 27.7968$ | $d_2 = 7.628$ | $n_{d2} = 1.48749$ | $\nu_{d2} = 70.23$ |
| $r_3 = -1371.6113$ | $d_3 = 0.150$ | | |
| $r_4 = 25.0867$ | $d_4 = 5.134$ | $n_{d3} = 1.67790$ | $\nu_{d3} = 50.72$ |
| $r_5 = 56.5248$ | $d_5 =$ (Variable) | | |
| $r_6 = 37.0337$ | $d_6 = 0.800$ | $n_{d4} = 1.72000$ | $\nu_{d4} = 46.04$ |
| $r_7 = 6.6567$ | $d_7 = 5.137$ | | |
| $r_8 = -17.2241$ | $d_8 = 0.800$ | $n_{d5} = 1.48749$ | $\nu_{d5} = 70.23$ |
| $r_9 = 8.2991$ | $d_9 = 2.760$ | $n_{d6} = 1.76182$ | $\nu_{d6} = 26.52$ |
| $r_{10} = 27.3936$ | $d_{10} =$ (Variable) | | |
| $r_{11} = \infty$ (Stop) | $d_{11} = 0.800$ | | |
| $r_{12} = 12.1745$ (Aspheric) | $d_{12} = 3.452$ | $n_{d7} = 1.58913$ | $\nu_{d7} = 61.14$ |
| $r_{13} = 93.784182$ | $d_{13} = 0.000$ | $n_{d8} = 1001.00$ | $\nu_{d8} = -3.45$ |

-continued

| | | | |
|---|---|---|---|
| $r_{14}$ = 93.806930 (Dif. sur.) | $d_{14}$ = (Variable) | | |
| $r_{15}$ = 18.0601 | $d_{15}$ = 0.801 | $n_{d9}$ = 1.74950 | $v_{d9}$ = 35.28 |
| $r_{16}$ = 5.6757 | $d_{16}$ = 3.009 | $n_{d10}$ = 1.62041 | $v_{d10}$ = 60.29 |
| $r_{17}$ = −21.5212 | $d_{17}$ = (Variable) | | |
| $r_{18}$ = ∞ | $d_{18}$ = 3.000 | $n_{d11}$ = 1.51633 | $v_{d11}$ = 64.14 |
| $r_{19}$ = ∞ | | | |

Zooming Spaces

| f | 5.05 | 17.74 | 50.00 |
|---|---|---|---|
| $d_5$ | 1.146 | 17.548 | 26.340 |
| $d_{10}$ | 26.383 | 9.982 | 1.169 |
| $d_{14}$ | 5.370 | 1.466 | 0.800 |
| $d_{17}$ | 9.552 | 13.462 | 14.122 |

Aspherical Coefficients
12th surface
K=0.00
$A_4$=6.6419×10$^{-5}$
$A_6$=−2.8229×10$^{-5}$
$A_8$=2.5591×10$^{-6}$
$A_{10}$=−9.2077×10$^{-8}$
13th surface
K=−1.00
$A_4$=−1.0012×10$^{-7}$
$A_6$=−9.7044×10$^{-10}$
$A_8$=−3.8160×10$^{-10}$
$A_{10}$=−5.3373×10$^{-11}$
14th surface
K=−1.00
$A_4$=2.9316×10$^{-8}$
$A_6$=−2.2933×10$^{-8}$
$A_8$=1.6805×10$^{-9}$
$A_{10}$=−1.3068×10$^{-10}$
$f_{DOE}$=386.7484
$R_{a1}/f_S$=0.766
$f_a/f_{DOE}$=0.057
$f_S/f_a$=0.72
$S_{DOE}$=−1.298

EXAMPLE 6

| | | | |
|---|---|---|---|
| | f = 5.05~10.01~15.00 | | |
| | $F_{NO}$ = 2.8~3.6~4.6 | | |
| | 2ω = 62.4°~34.0°~23.1° | | |
| $r_1$ = 21.589 | $d_1$ = 2.50 | $n_{d1}$ = 1.48749 | $v_{d1}$ = 70.23 |
| $r_2$ = −209.683 | $d_2$ = (Variable) | | |
| $r_3$ = 33.659 | $d_3$ = 0.75 | $n_{d2}$ = 1.76182 | $v_{d2}$ = 26.52 |
| $r_4$ = 5.211 | $d_4$ = 3.11 | | |
| $r_5$ = −20.653 | $d_5$ = 0.75 | $n_{d3}$ = 1.48749 | $v_{d3}$ = 70.23 |
| $r_6$ = 6.140 | $d_6$ = 2.50 | $n_{d4}$ = 1.76182 | $v_{d4}$ = 26.52 |
| $r_7$ = 53.052 | $d_7$ = (Variable) | | |
| $r_8$ = ∞ (Stop) | $d_8$ = (Variable) | | |
| $r_9$ = 6.178 (Aspheric) | $d_9$ = 2.90 | $n_{d5}$ = 1.66910 | $v_{d5}$ = 55.39 |
| $r_{10}$ = −19.424194 (Aspheric) | $d_{10}$ = 0.00 | $n_{d6}$ = 1001.00 | $v_{d6}$ = −3.45 |
| $r_{11}$ = −19.422644 (Dif. sur.) | $d_{11}$ = 0.94 | | |
| $r_{12}$ = 11.049 | $d_{12}$ = 0.70 | $n_{d7}$ = 1.84666 | $v_{d7}$ = 23.78 |
| $r_{13}$ = 4.597 | $d_{13}$ = (Variable) | | |
| $r_{14}$ = 15.992 | $d_{14}$ = 1.60 | $n_{d8}$ = 1.62041 | $v_{d8}$ = 60.28 |
| $r_{15}$ = −26.128 | $d_{15}$ = (Variable) | | |
| $r_{16}$ = ∞ | $d_{16}$ = 2.86 | $n_{d9}$ = 1.51633 | $v_{d9}$ = 64.14 |
| $r_{17}$ = ∞ | | | |

-continued

Zooming Spaces

| f | 5.05 | 10.01 | 15.00 |
|---|---|---|---|
| $d_2$ | 0.683 | 6.267 | 8.241 |
| $d_7$ | 8.575 | 2.991 | 1.017 |
| $d_8$ | 5.901 | 2.796 | 0.500 |
| $d_{13}$ | 1.133 | 2.226 | 2.456 |
| $d_{15}$ | 4.628 | 6.540 | 8.806 |

Aspherical Coefficients
9th surface
K=−0.2184
$A_4$=−5.5277×10$^{-4}$
$A_6$=−1.5798×10$^{-5}$
$A_8$=9.1866×10$^{-7}$
$A_{10}$=−4.7112×10$^{-8}$
10th surface
K=−1.00
$A_4$=1.5816×10$^{-7}$
$A_6$=1.0389×10$^{-8}$
$A_8$=−3.2868×10$^{-9}$
$A_{10}$=−1.5818×10$^{-10}$
11th surface
K=−1.00
$A_4$=2.5739×10$^{-7}$
$A_6$=9.5860×10$^{-10}$
$A_8$=−2.9576×10$^{-9}$
$A_{10}$=−1.7614×10$^{-10}$
$f_{DOE}$=243.400
$R_{a1}/f_S$=0.710
$f_a/f_{DOE}$=0.051
$f_S/f_a$=0.69
$f_{DOE}/V$=−0.448

EXAMPLE 7

| | | | |
|---|---|---|---|
| | f = 5.05~14.90~30.00 | | |
| | $F_{NO}$ = 2.8~3.8~4.0 | | |
| | 2ω = 62.4°~23.2°~11.6° | | |
| $r_1$ = 21.881 | $d_1$ = 0.75 | $n_{d1}$ = 1.76182 | $v_{d1}$ = 26.52 |
| $r_2$ = 13.702 | $d_2$ = 2.71 | | |
| $r_3$ = 15.619 | $d_3$ = 4.63 | $n_{d2}$ = 1.62280 | $v_{d2}$ = 57.05 |
| $r_4$ = −89.688 | $d_4$ = (Variable) | | |
| $r_5$ = 218.292 | $d_5$ = 0.75 | $n_{d3}$ = 1.77250 | $v_{d3}$ = 49.60 |
| $r_6$ = 8.941 | $d_6$ = 3.39 | | |
| $r_7$ = −14.544 | $d_7$ = 0.75 | $n_{d4}$ = 1.48749 | $v_{d4}$ = 70.23 |
| $r_8$ = 13.259 | $d_8$ = 2.50 | $n_{d5}$ = 1.84666 | $v_{d5}$ = 23.78 |
| $r_9$ = 67.377 | $d_9$ = (Variable) | | |
| $r_{10}$ = ∞ (Stop) | $d_{10}$ = (Variable) | | |
| $r_{11}$ = 5.905 (Aspheric) | $d_{11}$ = 3.82 | $n_{d6}$ = 1.66910 | $v_{d6}$ = 55.39 |
| $r_{12}$ = 52.685181 (Aspheric) | $d_{12}$ = 0.00 | $n_{d7}$ = 1001.00 | $v_{d7}$ = −3.45 |
| $r_{13}$ = 52.694240 (Dif. sur.) | $d_{13}$ = 0.99 | | |
| $r_{14}$ = 7.620 | $d_{14}$ = 0.70 | $n_{d8}$ = 1.84666 | $v_{d8}$ = 23.78 |
| $r_{15}$ = 3.932 | $d_{15}$ = (Variable) | | |
| $r_{16}$ = 7.289 | $d_{16}$ = 1.60 | $n_{d9}$ = 1.56384 | $v_{d9}$ = 60.67 |
| $r_{17}$ = −2588.420 | $d_{17}$ = (Variable) | | |
| $r_{18}$ = ∞ | $d_{18}$ = 2.86 | $n_{d10}$ = 1.51633 | $v_{d10}$ = 64.14 |
| $r_{19}$ = ∞ | | | |

Zooming Spaces

| f | 5.05 | 14.90 | 30.00 |
|---|---|---|---|
| $d_4$ | 0.510 | 10.308 | 16.580 |

-continued

| | | | |
|---|---|---|---|
| $d_9$ | 16.869 | 6.871 | 0.799 |
| $d_{10}$ | 6.305 | 1.362 | 0.500 |
| $d_{15}$ | 1.518 | 3.778 | 3.856 |
| $d_{17}$ | 5.304 | 8.087 | 8.871 |

Aspherical Coefficients
11th surface
K=0.00
$A_4=-3.4950\times10^{-4}$
$A_6=-8.4230\times10^{-7}$
$A_8=-1.0159\times10^{-6}$
$A_{10}=2.1001\times10^{-8}$
12th surface
K=-1.00
$A_4=-4.6107\times10^{-6}$
$A_6=3.0611\times10^{-7}$
$A_8=-1.8674\times10^{-8}$
$A_{10}=1.1957\times10^{-9}$
13th surface
K=-1.00
$A_4=-4.5395\times10^{-6}$
$A_6=-3.0152\times10^{-7}$
$A_8=-1.8546\times10^{-8}$
$A_{10}=1.1653\times10^{-9}$
$f_{DOE}=306.458$
$R_{a1}/f_S=0.480$
$f_a/f_{DOE}=0.060$
$f_S/f_a=0.67$
$f_{DOE}/V=-0.650$

EXAMPLE 8

| | | | |
|---|---|---|---|
| | f = 5.05~13.50~30.00 | | |
| | $F_{NO}$ = 2.8~3.7~4.9 | | |
| | 2ω = 62.4°~25.5°~11.6° | | |
| $r_1$ = 20.487 | $d_1$ = 0.70 | $n_{d1}$ = 1.76182 | $v_{d1}$ = 26.52 |
| $r_2$ = 11.553 | $d_2$ = 6.04 | $n_{d2}$ = 1.62374 | $v_{d2}$ = 47.10 |
| $r_3$ = -1112.142 | $d_3$ = (Variable) | | |
| $r_4$ = 41.383 | $d_4$ = 0.75 | $n_{d3}$ = 1.77250 | $v_{d3}$ = 49.60 |
| $r_5$ = 8.014 | $d_5$ = 5.35 | | |
| $r_6$ = -11.784 | $d_6$ = 0.75 | $n_{d4}$ = 1.48749 | $v_{d4}$ = 70.23 |
| $r_7$ = 11.122 | $d_7$ = 2.30 | $n_{d5}$ = 1.84666 | $v_{d5}$ = 23.78 |
| $r_8$ = 38.191 | $d_8$ = (Variable) | | |
| $r_9$ = ∞ (Stop) | $d_9$ = (Variable) | | |
| $r_{10}$ = 5.673 (Aspheric) | $d_{10}$ = 2.63 | $n_{d6}$ = 1.66910 | $v_{d6}$ = 55.39 |
| $r_{11}$ = 38.617 (Aspheric) | $d_{11}$ = 1.66 | | |
| $r_{12}$ = 7.499950 (Dif. sur.) | $d_{12}$ = 0.00 | $n_{d7}$ = 1001.00 | $v_{d7}$ = -3.45 |
| $r_{13}$ = 7.500104 (Aspheric) | $d_{13}$ = 0.80 | $n_{d8}$ = 1.84666 | $v_{d8}$ = 23.78 |
| $r_{14}$ = 3.993 | $d_{14}$ = (Variable) | | |
| $r_{15}$ = 6.904 | $d_{15}$ = 1.91 | $n_{d8}$ = 1.48749 | $v_{d8}$ = 70.23 |
| $r_{16}$ = -67.986 | $d_{16}$ = (Variable) | | |
| $r_{17}$ = ∞ | $d_{17}$ = 2.86 | $n_{d10}$ = 1.51633 | $v_{d10}$ = 64.14 |
| $r_{18}$ = ∞ | | | |
| Zooming Spaces | | | |

| f | 5.05 | 13.50 | 30.00 |
|---|---|---|---|
| $d_3$ | 0.537 | 8.962 | 13.985 |
| $d_8$ | 14.212 | 5.760 | 0.856 |
| $d_9$ | 8.047 | 3.458 | 0.500 |
| $d_{14}$ | 1.500 | 3.229 | 2.671 |

-continued

| | | | |
|---|---|---|---|
| $d_{16}$ | 4.916 | 7.703 | 11.300 |

Aspherical Coefficients
10th surface
K=0.00
$A_4=-4.0867\times10^{-4}$
$A_6=3.8997\times10^{-6}$
$A_8=-1.1355\times10^{-6}$
$A_{10}=2.7725\times10^{-8}$
11th surface
K=0.00
$A_4=-5.9327\times10^{-5}$
$A_6=4.5459\times10^{-6}$
$A_8=3.1078\times10^{-8}$
$A_{10}=2.2560\times10^{-10}$
12th surface
K=-1.00
$A_4=-1.0951\times10^{-7}$
$A_6=-8.2125\times10^{-9}$
$A_8=-6.3957\times10^{-10}$
$A_{10}=1.9025\times10^{-11}$
13th surface
K=-1.00
$A_4=-1.7425\times10^{-7}$
$A_6=4.0283\times10^{-9}$
$A_8=-2.4225\times10^{-9}$
$A_{10}=1.0134\times10^{-10}$
$f_{DOE}=365.262$
$R_{a1}/f_S=0.461$
$f_a/f_{DOE}=0.047$
$f_S/f_a=0.72$
$f_{DOE}/V=-0.679$

EXAMPLE 9

| | | | |
|---|---|---|---|
| | f = 5.05~16.02~50.00 | | |
| | $F_{NO}$ = 2.8~3.1~3.4 | | |
| | 2ω = 62.4°~21.6°~7.0° | | |
| $r_1$ = 51.635 | $d_1$ = 1.00 | $n_{d1}$ = 1.76182 | $v_{d1}$ = 26.52 |
| $r_2$ = 29.948 | $d_2$ = 6.67 | $n_{d2}$ = 1.48749 | $v_{d2}$ = 70.23 |
| $r_3$ = -1100.504 | $d_3$ = 0.15 | | |
| $r_4$ = 26.199 | $d_4$ = 4.36 | $n_{d3}$ = 1.65160 | $v_{d3}$ = 58.55 |
| $r_5$ = 59.301 | $d_5$ = (Variable) | | |
| $r_6$ = 34.443 | $d_6$ = 0.80 | $n_{d4}$ = 1.76200 | $v_{d4}$ = 40.10 |
| $r_7$ = 7.006 | $d_7$ = 5.56 | | |
| $r_8$ = -21.202 | $d_8$ = 0.80 | $n_{d5}$ = 1.48749 | $v_{d5}$ = 70.23 |
| $r_9$ = 8.694 | $d_9$ = 3.03 | $n_{d6}$ = 1.76182 | $v_{d6}$ = 26.52 |
| $r_{10}$ = 32.188 | $d_{10}$ = (Variable) | | |
| $r_{11}$ = ∞ (Stop) | $d_{11}$ = (Variable) | | |
| $r_{12}$ = 12.905 (Aspheric) | $d_{12}$ = 2.60 | $n_{d7}$ = 1.58913 | $v_{d7}$ = 61.14 |
| $r_{13}$ = -1002.302408 (Aspheric) | $d_{13}$ = 0.00 | $n_{d8}$ = 1001.00 | $v_{d8}$ = -3.45 |
| $r_{14}$ = -1000.337125 (Dif. sur.) | $d_{14}$ = 0.15 | | |
| $r_{15}$ = 9.956 | $d_{15}$ = 1.73 | $n_{d9}$ = 1.76182 | $v_{d9}$ = 26.52 |
| $r_{16}$ = 8.393 | $d_{16}$ = (Variable) | | |
| $r_{17}$ = 16.771 | $d_{17}$ = 0.90 | $n_{d10}$ = 1.76182 | $v_{d10}$ = 26.52 |
| $r_{18}$ = 6.665 | $d_{18}$ = 3.20 | $d_{d11}$ = 1.58904 | $v_{d11}$ = 53.20 |
| $r_{19}$ = -21.488 | $d_{19}$ = (Variable) | | |
| $r_{20}$ = INF | $d_{20}$ = 3.70 | $n_{d12}$ = 1.51633 | $v_{d12}$ = 64.14 |

-continued $r_{21}$ = INF
Zooming Spaces

| f | 5.05 | 16.02 | 50.00 |
|---|---|---|---|
| $d_5$ | 1.064 | 17.129 | 27.067 |
| $d_{10}$ | 27.338 | 11.173 | 1.335 |
| $d_{11}$ | 3.730 | 2.753 | 0.800 |
| $d_{16}$ | 3.409 | 1.301 | 2.384 |
| $d_{19}$ | 8.268 | 11.402 | 12.272 |

Aspherical Coefficients
12th surface
K=0.00
$A_4=-5.0985\times10^{-7}$
$A_6=-1.6417\times10^{-5}$
$A_8=1.5718\times10^{-6}$
$A_{10}=-5.8913\times10^{-8}$
13th surface
K=−1.00
$A_4=-3.0929\times10^8$
$A_6=-1.3976\times10^{-8}$
$A_8=3.8705\times10^{-10}$
$A_{10}=1.8746\times10^{-11}$
14th surface
K=−1.00
$A_4=3.2743\times10^{-8}$
$A_6=-2.5612\times10^{-8}$
$A_8=1.5145\times10^{-9}$
$A_{10}=-2.4043\times10^{-11}$
$f_{DOE}=510.176$
$R_{a1}/f_S=0.812$
$f_a/f_{DOE}=0.043$
$f_S/f_a=0.72$
$f_{DOE}/V=0.245$

EXAMPLE 10 f = 5.05~16.81~50.00
$F_{NO}$ = 2.8~3.3~4.6
2ω = 62.4°~20.6°~7.0°

| | | | |
|---|---|---|---|
| $r_1$ = 45.239 | $d_1$ = 1.00 | $n_{d1}$ = 1.76182 | $v_{d1}$ = 26.52 |
| $r_2$ = 28.920 | $d_2$ = 6.54 | $n_{d2}$ = 1.48749 | $v_{d2}$ = 70.23 |
| $r_3$ = 1436.854 | $d_3$ = 0.15 | | |
| $r_4$ = 29.776 | $d_4$ = 4.20 | $n_{d3}$ = 1.65160 | $v_{d3}$ = 58.55 |
| $r_5$ = 108.921 | $d_5$ = (Variable) | | |
| $r_6$ = 58.876 | $d_6$ = 0.80 | $n_{d4}$ = 1.74950 | $v_{d4}$ = 35.28 |
| $r_7$ = 7.824 | $d_7$ = 5.70 | | |
| $r_8$ = −24.279 | $d_8$ = 0.80 | $n_{d5}$ = 1.48749 | $v_{d5}$ = 70.23 |
| $r_9$ = 9.757 | $d_9$ = 3.18 | $n_{d6}$ = 1.76182 | $v_{d6}$ = 26.52 |
| $r_{10}$ = 53.946 | $d_{10}$ = (Variable) | | |
| $r_{11}$ = ∞ (Stop) | $d_{11}$ = (Variable) | | |
| $r_{12}$ = 7.958 (Aspheric) | $d_{12}$ = 2.60 | $n_{d7}$ = 1.58913 | $v_{d7}$ = 61.14 |
| $r_{13}$ = −129.207984 (Aspheric) | $d_{13}$ = 0.00 | $n_{d8}$ = 1001.00 | $v_{d8}$ = −3.45 |
| $r_{14}$ = −129.165303 (Dif. sur.) | $d_{14}$ = 2.53 | | |
| $r_{15}$ = 11.069 | $d_{15}$ = 0.80 | $n_{d9}$ = 1.76182 | $v_{d9}$ = 26.52 |
| $r_{16}$ = 5.725 | $d_{16}$ = (Variable) | | |
| $r_{17}$ = 7.802 | $d_{17}$ = 3.20 | $n_{d10}$ = 1.48749 | $v_{d10}$ = 70.23 |
| $r_{18}$ = 224.014 (Aspheric) | $d_{18}$ = (Variable) | | |
| $r_{19}$ = ∞ | $d_{19}$ = 3.70 | $nd_{11}$ = 1.51633 | $v_{d11}$ = 64.14 |
| $r_{20}$ = ∞ | | | |

Zooming Spaces

| f | 5.05 | 16.81 | 50.00 |
|---|---|---|---|
| $d_5$ | 0.800 | 15.527 | 22.787 |
| $d_{10}$ | 23.090 | 8.263 | 1.203 |
| $d_{11}$ | 11.969 | 8.171 | 0.800 |
| $d_{16}$ | 1.165 | 3.821 | 12.553 |
| $d_{18}$ | 5.065 | 6.258 | 4.797 |

Aspherical Coefficients
12th surface
K=0.00
$A_4=-2.1431\times10^{-4}$
$A_6=3.2636\times10^{-6}$
$A_8=-3.1615\times10^{-7}$
$A_{10}=5.4824\times10^{-9}$
13th surface
K=−1.00
$A_4=-1.9779\times10^{-7}$
$A_6=-2.2247\times10^{-9}$
$A_8=1.7178\times10^{-10}$
$A_{10}=-6.7101\times10^{-12}$
14th surface
K=−1.00
$A_4=-2.2046\times10^{-7}$
$A_6=2.9164\times10^{-9}$
$A_8=-1.6145\times10^{-10}$
$A_{10}=3.2090\times10^{-13}$
18th surface
K=0.00
$A_4=2.0017\times10^{-4}$
$A_6=-1.8293\times10^{-6}$
$A_8=1.2068\times10^{-7}$
$A_{10}=-2.5837\times10^{-9}$
$f_{DOE}=391.0246$
$R_{a1}/f_S=0.501$
$f_a/f_{DOE}=0.057$
$f_S/f_a=0.71$
$f_{DOE}/V=-0.387$

EXAMPLE 11 f = 5.048~17.00~50.000
$F_{NO}$ = 2.8~3.6~3.6
2ω = 62.4°~20.4°~7.0°

| | | | |
|---|---|---|---|
| $r_1$ = 47.625 | $d_1$ = 1.00 | $n_{d1}$ = 1.84666 | $v_{d1}$ = 23.78 |
| $r_2$ = 27.359 | $d_2$ = 6.68 | $n_{d2}$ = 1.62041 | $v_{d2}$ = 60.29 |
| $r_3$ = 723.216 | $d_3$ = 0.15 | | |
| $r_4$ = 23.586 | $d_4$ = 4.96 | $n_{d3}$ = 1.62041 | $v_{d3}$ = 60.29 |
| $r_5$ = 60.971 | $d_5$ = (Variable) | | |
| $r_6$ = 56.592 | $d_6$ = 0.80 | $n_{d4}$ = 1.74400 | $v_{d4}$ = 44.78 |
| $r_7$ = 6.531 | $d_7$ = 4.99 | | |
| $r_8$ = −26.567 | $d_8$ = 0.80 | $n_{d5}$ = 1.51454 | $v_{d5}$ = 54.71 |
| $r_9$ = 8.019 | $d_9$ = 2.70 | $n_{d6}$ = 1.84666 | $v_{d6}$ = 23.78 |
| $r_{10}$ = 20.353 | $d_{10}$ = (Variable) | | |
| $r_{11}$ = ∞ (Stop) | $d_{11}$ = (Variable) | | |
| $r_{12}$ = 9.523 (Aspheric) | $d_{12}$ = 2.50 | $n_{d7}$ = 1.58913 | $v_{d7}$ = 61.14 |
| $r_{13}$ = 13.217407 (Aspheric) | $d_{13}$ = 0.00 | $n_{d8}$ = 1001.00 | $v_{d8}$ = −3.45 |
| $r_{14}$ = 13.217746 (Dif. sur.) | $d_{14}$ = 1.03 | | |
| $r_{15}$ = 30.204 | $d_{15}$ = 2.50 | $n_{d9}$ = 1.69100 | $v_{d9}$ = 54.82 |

-continued

| | | | |
|---|---|---|---|
| $r_{16} = -21.795$ | $d_{16}$ = (Variable) | | |
| $r_{17} = 13.333$ | $d_{17} = 0.80$ | $n_{d10} = 1.74000$ | $v_{d10} = 28.28$ |
| $r_{18} = 5.176$ | $d_{18} = 3.00$ | $n_{d11} = 1.58913$ | $v_{d11} = 61.14$ |
| $r_{19} = 62.088$ | $d_{19}$ = (Variable) | | |
| $r_{20} = \infty$ | $d_{20} = 3.00$ | $n_{d12} = 1.51633$ | $v_{d12} = 64.14$ |
| $r_{21} = \infty$ | | | |

Zooming Spaces

| f | 5.048 | 17.00 | 50.000 |
|---|---|---|---|
| $d_5$ | 1.555 | 12.731 | 20.930 |
| $d_{10}$ | 20.386 | 9.129 | 1.111 |
| $d_{11}$ | 4.696 | 0.982 | 0.800 |
| $d_{16}$ | 1.729 | 2.644 | 5.033 |
| $d_{19}$ | 7.254 | 10.085 | 7.796 |

Aspherical Coefficients
12th surface
K=0.00
$A_4=-9.1441\times10^{-5}$
$A_6=-1.8334\times10^{-5}$
$A_8=1.0501\times10^{-6}$
$A_{10}=-2.2216\times10^{-8}$
13th surface
K=-1.00
$A_4=1.8535\times10^{-8}$
$A_6=1.2694\times10^{-9}$
$A_8=-4.4852\times10^{-10}$
$A_{10}=-1.0217\times10^{-10}$
14th surface
K=-1.00
$A_4=1.0929\times10^{-7}$
$A_6=-1.2418\times10^{-8}$
$A_8=4.5970\times10^{-10}$
$A_{10}=-1.2510\times10^{10}$
$f_{DOE}=514.6928$
$R_{a1}/f_S=0.599$
$f_a/f_{DOE}=0.028$
$f_S/f_a=1.101$
$S_{DOE}=-6.155$

EXAMPLE 12

| | | | |
|---|---|---|---|
| | f = 5.050~17.00~50.000 | | |
| | $F_{NO}$ = 2.8~3.2~3.5 | | |
| | 2ω = 62.4°~20.4°~7.0° | | |
| $r_1 = 52.881$ | $d_1 = 1.00$ | $n_{d1} = 1.76182$ | $v_{d1} = 26.52$ |
| $r_2 = 28.683$ | $d_2 = 6.68$ | $n_{d2} = 1.48749$ | $v_{d2} = 70.23$ |
| $r_3 = -1215.929$ | $d_3 = 0.15$ | | |
| $r_4 = 27.007$ | $d_4 = 4.90$ | $n_{d3} = 1.65160$ | $v_{d3} = 58.55$ |
| $r_5 = 88.499$ | $d_5$ = (Variable) | | |
| $r_6 = 40.818$ | $d_6 = 0.80$ | $n_{d4} = 1.77250$ | $v_{d4} = 49.60$ |
| $r_7 = 7.678$ | $d_7 = 5.87$ | | |
| $r_8 = -27.687$ | $d_8 = 0.80$ | $n_{d5} = 1.48749$ | $v_{d5} = 70.23$ |
| $r_9 = 9.716$ | $d_9 = 2.90$ | $n_{d6} = 1.76182$ | $v_{d6} = 26.52$ |
| $r_{10} = 31.866$ | $d_{10}$ = (Variable) | | |
| $r_{11} = \infty$ (Stop) | $d_{11}$ = (Variable) | | |
| $r_{12} = 6.154$ (Aspheric) | $d_{12} = 2.58$ | $n_{d7} = 1.58913$ | $v_{d7} = 61.14$ |
| $r_{13} = -105.672$ | $d_{13} = 0.30$ | | |
| $r_{14} = 9.686$ | $d_{14} = 0.83$ | $n_{d8} = 1.76182$ | $v_{d8} = 26.52$ |
| $r_{15} = 4.955$ | $d_{15}$ = (Variable) | | |
| $r_{16} = 12.122$ | $d_{16} = 3.00$ | $n_{d9} = 1.58913$ | $v_{d9} = 61.14$ |
| $r_{17} = 191.303222$ (Aspheric) | $d_{17} = 0.00$ | $n_{d10} = 1001.00$ | $v_{d10} = -3.45$ |
| $r_{18} = 191.452395$ | $d_{18}$ = (Variable) | | |

(Dif. sur.)

| | | | |
|---|---|---|---|
| $r_{19} = \infty$ | $d_{19} = 3.70$ | $n_{d11} = 1.51633$ | $v_{d11} = 64.14$ |
| $r_{20} = \infty$ | | | |

Zooming Spaces

| f | 5.050 | 17.00 | 50.000 |
|---|---|---|---|
| $d_5$ | 0.800 | 16.004 | 24.852 |
| $d_{10}$ | 24.910 | 9.606 | 0.958 |
| $d_{11}$ | 5.426 | 3.579 | 0.842 |
| $d_{15}$ | 1.824 | 1.725 | 6.491 |
| $d_{18}$ | 6.271 | 8.267 | 6.138 |

Aspherical Coefficients
12th surface
K=0.00
$A_4=-3.6327\times10^{-4}$
$A_6=-6.9614\times10^{-6}$
$A_8=-9.6651\times10^{-8}$
$A_{10}=-3.6965\times10^{-9}$
17th surface
K=0.00
$A_4=-3.1900\times10^{-8}$
$A_6=1.5938\times10^{-9}$
$A_8=2.7754\times10^{-10}$
$A_{10}=7.7833\times10^{-12}$
18th surface
K=0.00
$A_4=3.0748\times10^{-8}$
$A_6=-2.2451\times10^{-9}$
$A_8=5.2198\times10^{-10}$
$A_{10}=-5.3955\times10^{-12}$
$f_{DOE}=245.5232$
$R_{a1}/f_S=0.763$
$f_a/f_{DOE}=0.082$
$f_S/f_a=0.79$
$S_{DOE}=-1.135$ Aberration diagrams for Example 1 at the wide-angle end, standard setting, and telephoto end are shown in FIGS. 13 to 15. In these aberration diagrams, (*a*), (*b*), (*c*) and (*d*) stand for spherical aberration, astigmatism, distortion and chromatic aberration of magnification, respectively.

As is evident from the foregoing explanation, the present invention provides a high-performance zoom lens system which is well corrected for chromatic aberration by use of a DOE, makes the angle of incidence of a ray bundle on a diffractive surface as small as possible from a wide-angle side to a telephoto side thereof, and ensures the sufficient number of DOE gratings with respect to the ray bundle, with a reduced number of lenses.

What we claim is:

1. A zoom lens system, comprising;
   a negative lens group having a magnification variance greater than other lens groups of the zoom lens system; and
   a positive lens group located on an image side thereof,
   a surface in said positive lens group, which surface is located nearest to an object side of said zoom lens system, satisfying the following condition (1) and,
   a surface in said positive lens group, which surface is located nearer to the image side, having a diffractive surface:

$$0.2 < R_{a1}/f_S < 3.0 \qquad (1)$$

where $f_S$ is $f_S=\sqrt{(f_W \times f_T)}$ wherein $f_W$ is a d-line focal length of said zoom lens system at a wide-angle end thereof and $f_T$ is a d-line focal length of said zoom lens system at a telephoto end thereof, and $R_{a1}$ is a paraxial radius of curvature of a surface in said lens group having a diffractive surface, which surface is located nearest to an object side of the zoom lens system.

2. A zoom lens system, comprising, in order from an object side thereof:

a first lens group;

a negative lens group having a magnification variance greater than other lens groups of the zoom lens system; and a positive lens group, said positive lens group having therein a diffractive surface satisfying the following condition (2):

$$0.03 < f_a/f_{DOE} < 0.50 \tag{2}$$

where $f_a$ is a d-line focal length of said lens group having a diffractive surface and $f_{DOE}$ is a d-line focal length of said diffractive surface.

3. The zoom lens system according to claim 1 or 2, further satisfying the following condition (5):

$$-5.0 < S\text{DOE} < -1.0 \tag{5}$$

where $S_{DOE}$ is a shaping factor of said diffractive optical element or $S_{DOE}=(R_f+R_b)/(R_f-R_b)$ wherein $R_f$ and $R_b$ are paraxial radii of curvature of surfaces of said diffractive optical element located on the object and image sides, respectively, or a paraxial radius of curvature of substrate shape in the case of a surface having a diffractive surface formed thereon.

4. The zoom lens system according to claim 1 or 2 further satisfying the following condition (7):

$$-0.2 < f_{DOE}/V < 1.0 \tag{7}$$

where $f_{DOE}$ is a d-line focal length of said diffractive surface, and V is an equivalent Abbe's number of said positive lens group, and is a function of a focal length and an Abbe's number of a refractive lens except said diffractive surface, as defined below.

$$1/V = \sum_{l}^{n} (1/v_l f_l) \tag{8}$$

where $v_i$ and $f_i$ are an Abbe's number and a d-line focal length of an i-th lens in said positive lens group, respectively.

5. An image pickup device comprising a zoom lens system as recited in claim 1 or 2.

* * * * *